US012800990B2

(12) United States Patent
Chen et al.

(10) Patent No.: US 12,800,990 B2
(45) Date of Patent: Nov. 17, 2026

(54) IMAGE CAPTURING MODULE AND ELECTRONIC DEVICE

(71) Applicant: LARGAN PRECISION CO., LTD., Taichung City (TW)

(72) Inventors: Chun-Yen Chen, Taichung City (TW); Hsin-Hsuan Huang, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 648 days.

(21) Appl. No.: 18/138,940

(22) Filed: Apr. 25, 2023

(65) Prior Publication Data

US 2024/0288666 A1 Aug. 29, 2024

(30) Foreign Application Priority Data

Feb. 24, 2023 (TW) ................................ 112107089

(51) Int. Cl.

*G02B 13/00* (2006.01)
*G02B 9/64* (2006.01)
*G03B 9/02* (2021.01)

(52) U.S. Cl.

CPC ................. *G03B 9/02* (2013.01); *G02B 9/64* (2013.01); *G02B 13/0045* (2013.01)

(58) Field of Classification Search

CPC .... G02B 13/0045; G02B 9/64; G02B 13/003; G03B 9/02
See application file for complete search history.

(56) References Cited

U.S. PATENT DOCUMENTS

2018/0149833 A1 5/2018 Lee et al.
2018/0164544 A1 6/2018 Kwak et al.
2019/0018303 A1 1/2019 Chiu et al.
2019/0137736 A1 5/2019 Huh et al.
2022/0404588 A1 12/2022 Xiao et al.
2022/0413269 A1 12/2022 Yao et al.
2023/0003984 A1 1/2023 Yamanaka
2023/0034285 A1 2/2023 Hsu et al.
2025/0224594 A1* 7/2025 Wang ................. G02B 13/0045

FOREIGN PATENT DOCUMENTS

CN 110531494 A 12/2019
CN 110941061 A 3/2020
CN 111948872 A 11/2020
CN 113341540 A 9/2021
CN 113534403 A 10/2021

* cited by examiner

*Primary Examiner* — Wen Huang
(74) *Attorney, Agent, or Firm* — Maschoff Brennan

(57) ABSTRACT

An image capturing module includes an aperture control unit, an imaging lens assembly and an image sensor. The imaging lens assembly includes a first lens element which is the lens element closest to an object side among all lens elements of the imaging lens assembly. The image capturing module has a first state and a second state. When the image capturing module is at the first state, the imaging lens assembly has a first f-number and a first viewing angle. When the image capturing module is at the second state, the imaging lens assembly has a second f-number and a second viewing angle.

12 Claims, 26 Drawing Sheets

IMAGE CAPTURING MODULE AND ELECTRONIC DEVICE

RELATED APPLICATIONS

This application claims priority to Taiwan Application 112107089, filed on Feb. 24, 2023, which is incorporated by reference herein in its entirety.

BACKGROUND

Technical Field

The present disclosure relates to an image capturing module and an electronic device, more particularly to an image capturing module applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an image capturing module includes an aperture control unit, an imaging lens assembly and an image sensor. The imaging lens assembly includes an aperture stop and a first lens element, and the first lens element is closest to an object side among all lens elements of the imaging lens assembly.

The image capturing module has a first state and a second state. Preferably, when the image capturing module is at the first state, the imaging lens assembly has a first f-number and a first viewing angle, the first f-number is Fno1, and the first viewing angle is FOV1. Preferably, when the image capturing module is at the second state, the imaging lens assembly has a second f-number and a second viewing angle, the second f-number is Fno2, and the second viewing angle is FOV2. Preferably, a focal length of the imaging lens assembly is substantially same at both the first state and the second state. When the focal length of the imaging lens assembly is f, an entrance pupil diameter of the imaging lens assembly at the first state is EPD1, an entrance pupil diameter of the imaging lens assembly at the second state is EPD2, the first viewing angle is FOV1, the second viewing angle is FOV2, an axial distance between the aperture stop and an image surface at the first state is SL1, an axial distance between the aperture stop and the image surface at the second state is SL2, and an axial distance between an object-side surface of the first lens element and the image surface is TL, the following conditions are preferably satisfied:

$$1.5 < f/(EPD1 - EPD2) < 10.0;$$

$$10.0 \text{ degrees} < FOV2 - FOV1 < 50.0 \text{ degrees};$$

$$0.90 < SL1/SL2 < 0.99; \text{ and}$$

$$0.90 < TL/f < 1.80.$$

According to another aspect of the present disclosure, an image capturing module includes an aperture control unit, an imaging lens assembly and an image sensor. The imaging lens assembly includes a first lens element, and the first lens element is closest to an object side among all lens elements of the imaging lens assembly.

The image capturing module has a first state and a second state. Preferably, when the image capturing module is at the first state, the imaging lens assembly has a first f-number and a first viewing angle, the first f-number is Fno1, the first viewing angle is FOV1, and an image generated by the image capturing module is within a first sensing range. Preferably, when the image capturing module is at the second state, the imaging lens assembly has a second f-number and a second viewing angle, the second f-number is Fno2, the second viewing angle is FOV2, and an image generated by the image capturing module is within a second sensing range. Preferably, the first sensing range is encompassed within the second sensing range, the first sensing range is within an effective photosensitive area of the image sensor at the first state, and the second sensing range is within an effective photosensitive area of the image sensor at the second state. When a focal length of the imaging lens assembly is f, an entrance pupil diameter of the imaging lens assembly at the first state is EPD1, an entrance pupil diameter of the imaging lens assembly at the second state is EPD2, the first viewing angle is FOV1, the second viewing angle is FOV2, the first f-number is Fno1, half of a diagonal length of the first sensing range is ImgH1, and half of a diagonal length of the second sensing range is ImgH2, the following conditions are preferably satisfied:

$$1.5 < f/(EPD1 - EPD2) < 10.0;$$

$$10.0 \text{ degrees} < FOV2 - FOV1 < 50.0 \text{ degrees};$$

$$1.20 < Fno1 < 1.40; \text{ and}$$

$$1.20 \text{ mm} < ImgH2 - ImgH1 < 5.0 \text{ mm}.$$

According to another aspect of the present disclosure, an electronic device includes the aforementioned image capturing module, and the image capturing module includes a driving motor. Preferably, the driving motor is a voice coil motor. Preferably, the driving motor includes at least one ball.

BRIEF DESCRIPTION OF THE DRAWINGS

The disclosure can be better understood by reading the following detailed description of the embodiments, with reference made to the accompanying drawings as follows.

DETAILED DESCRIPTION

An image capturing module includes an aperture control unit, an imaging lens assembly and an image sensor. The imaging lens assembly includes an aperture stop and a first lens element, and the first lens element is the closest to an object side among all lens elements of the imaging lens assembly.

The image capturing module has a first state and a second state. When the image capturing module is at the first state, the imaging lens assembly has a first f-number and a first viewing angle, the first f-number is Fno1, and the first viewing angle is FOV1. When the image capturing module is at the second state, the imaging lens assembly has a second f-number and a second viewing angle, the second f-number is Fno2, and the second viewing angle is FOV2.

According to the present disclosure, the image capturing module can include a light blocking portion disposed at an object side of the imaging lens assembly. When the image capturing module is at the first state, the light blocking portion controls the amount of incident light in the image capturing module so as to be favorable for receiving light to facilitate portrait photography, highlight imaged object and blur background. When the image capturing module is at the second state, the aperture control unit controls the amount of incident light in the image capturing module so as to be favorable for capturing a wide-angle image and maintaining high resolution in every fields of view, and thus facilitate landscape photography.

When the image capturing module is at both the first state and the second state, a focal length of the imaging lens assembly can be substantially the same. In other words, the focal length of the imaging lens assembly will not change regardless of whether the image capturing module is at the first state or the second state. Therefore, it is favorable for effectively reducing the number of cameras and simplifying the manufacturing process.

Figure 20:
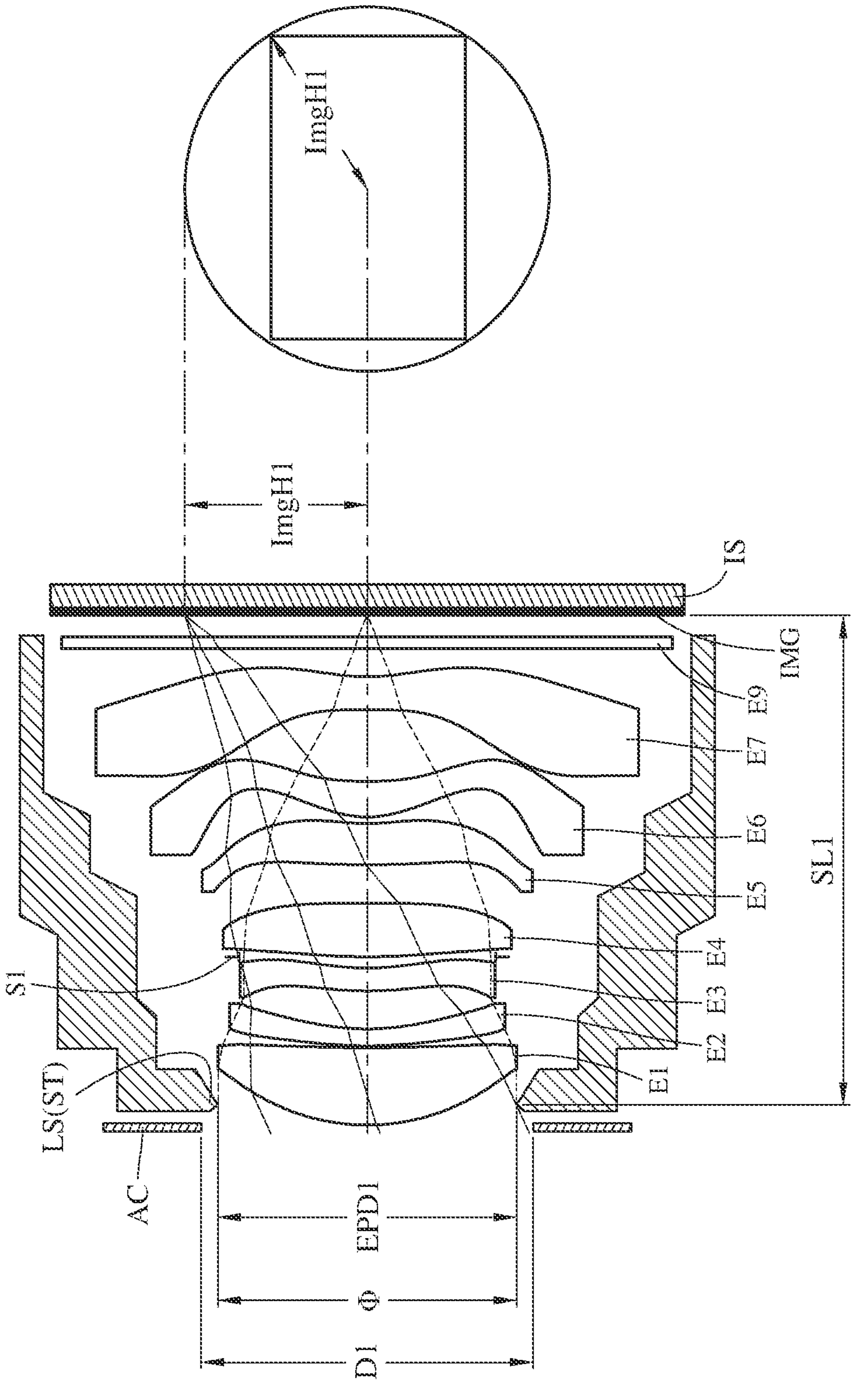
FIG. 20 is a schematic view of the image capturing module, including a lens barrel, at the first state according to the 1st embodiment of the present disclosure.
Figure 21:
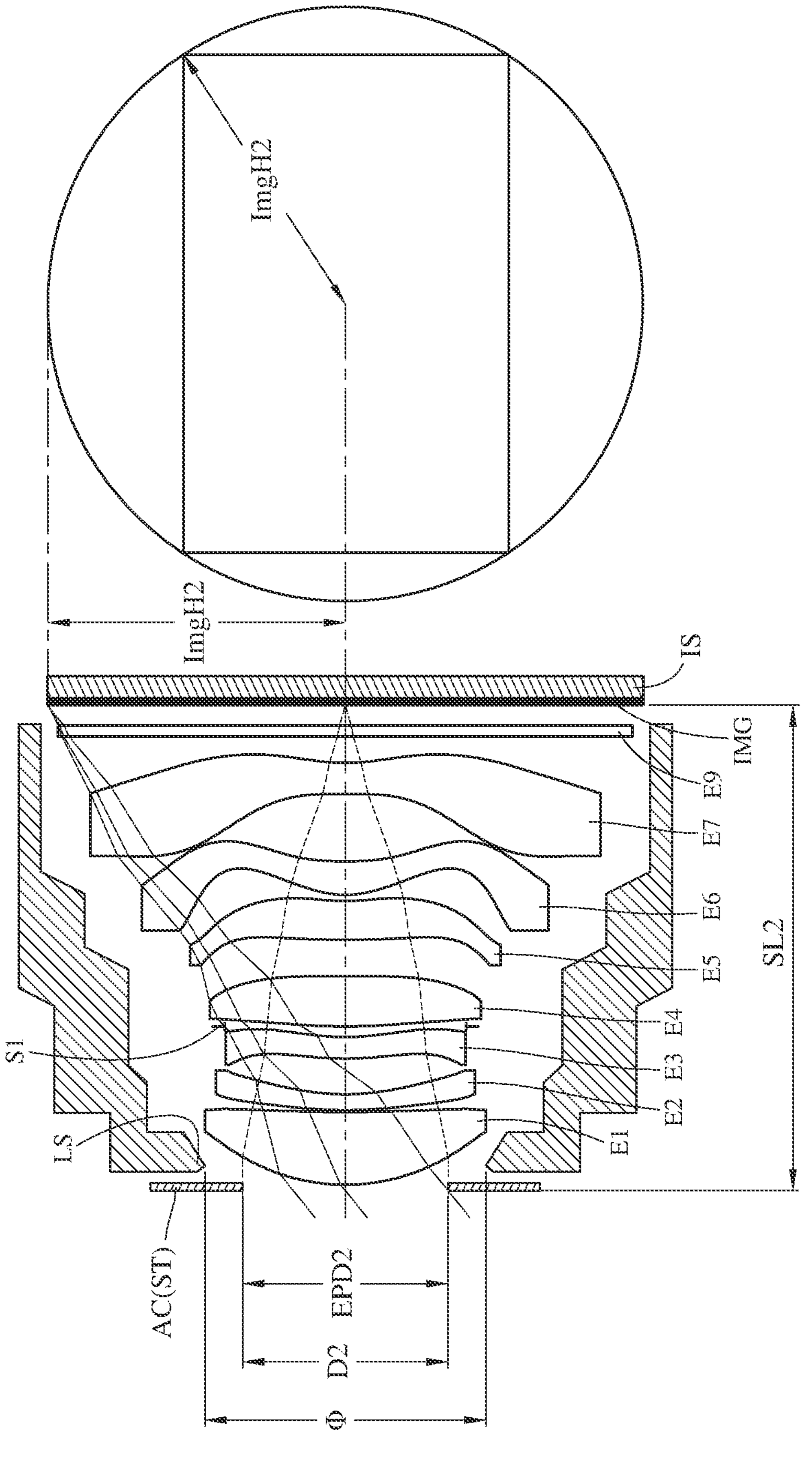
FIG. 21 is a schematic view of the image capturing module, including the lens barrel, at the second state according to the 1st embodiment of the present disclosure.

When the focal length of the imaging lens assembly is f, an entrance pupil diameter of the imaging lens assembly at the first state is EPD1, and an entrance pupil diameter of the imaging lens assembly at the second state is EPD2, the following condition is satisfied: $1.5<f/(EPD1-EPD2)<10.0$. Therefore, it is favorable for adjusting the amount of incident light in the image capturing module for different applications so as to achieve different imaging effects. Please refer to FIG. 20 showing a schematic view of the image capturing module, including a lens barrel, at the first state according to the 1st embodiment of the present disclosure, and the parameter EPD1 is exemplarily depicted. Please further refer to FIG. 21 showing a schematic view of the image capturing module, including the lens barrel, at the second state according to the 1st embodiment of the present disclosure, and the parameter EPD2 is exemplarily depicted.

When the first viewing angle is FOV1, and the second viewing angle is FOV2, the following condition is satisfied: $10.0\text{ degrees}<FOV2-FOV1<50.0\text{ degrees}$. Therefore, it is favorable for providing various modes with different shooting ranges so as to meet the requirements of landscape photography and portrait photography.

When an axial distance between the aperture stop and an image surface at the first state is SL1, and an axial distance between the aperture stop and the image surface at the second state is SL2, the following condition can be satisfied: $0.90<SL1/SL2<0.99$. Therefore, it is favorable for blocking stray light generated at the first state so as to prevent ghosting as well as flare. Also, it is favorable for the operation and assembly of the aperture control unit as well as the size optimization of the image capturing module. Referring to FIG. 20, an opening of the light blocking portion LS serves as the aperture stop ST, so that SL1 is equal to an axial distance between the opening of the light blocking portion LS and the image surface IMG. Referring to FIG. 21, an aperture of the aperture control unit AC serves as the aperture stop ST, so that SL2 is equal to an axial distance between the aperture of the aperture control unit AC and the image surface IMG.

When an axial distance between an object-side surface of the first lens element and the image surface is TL, and the focal length of the imaging lens assembly is f, the following condition can be satisfied: $0.90<TL/f<1.80$. Therefore, it is favorable for providing a specification that meets the photography for most users. Moreover, the following condition can also be satisfied: $1.0<TL/f<1.50$.

When the first f-number is Fno1, the following condition can be satisfied: $1.20<Fno1<1.40$. Therefore, it is favorable controlling the amount of incident light so as to obtain a balance between the depth of field and the image quality, thereby highlighting the details of the imaged object.

When the image capturing module is at the first state, an image generated by the image capturing module can be within a first sensing range. When the image capturing module is at the second state, an image generated by the image capturing module can be within a second sensing range, and the first sensing range can be encompassed within the second sensing range. The first sensing range is within an effective photosensitive area of the image sensor at the first state, and the second sensing range is within an effective photosensitive area of the image sensor at the second state. Therefore, it is favorable for enhancing the efficiency of the image sensor so as to reduce manufacturing costs and optimize space utilization.

When half of a diagonal length of the first sensing range is ImgH1, and half of a diagonal length of the second sensing range is ImgH2, the following condition can be satisfied: $1.20\ mm<ImgH2-ImgH1<5.0\ mm$. Therefore, it is favorable for the shooting experience with different viewing angles. Referring to FIG. 20 and FIG. 21, the parameters ImgH1 and ImgH2 are exemplarily depicted.

When the first f-number is Fno1, the second f-number is Fno2, the first viewing angle is FOV1, and the second viewing angle is FOV2, the following condition can be satisfied: $0\ [1/degree]<(Fno2-Fno1)/(FOV2-FOV1)<0.5\ [1/degree]$. Therefore, it is favorable for ensuring proportional relationship between aperture variations and viewing angles so as to provide various shooting experiences. Moreover, the following condition can also be satisfied: $0\ [1/degree]<(Fno2-Fno1)/(FOV2-FOV1)<0.2\ [1/degree]$.

When the first viewing angle is FOV1, the following condition can be satisfied: $40.0\ degrees<FOV1<55.0\ degrees$. Therefore, it is favorable for a proper sensing range for portrait photography.

The imaging lens assembly can include, in order from the object side to an image side along an optical path, the first lens element and a second lens element. When the axial distance between the aperture stop and the image surface at the first state is SL1, the axial distance between the aperture stop and the image surface at the second state is SL2, and an axial distance between the first lens element and the second lens element is T12, the following condition can be satisfied: $1.0<(SL2-SL1)/T12<25.0$. Therefore, a light blocking position closer to the first lens element is used at the first state, and an aperture stop closer to the object side is used at the second state so as to be favorable for controlling the size of the lens element at the object side and optimizing space utilization. Moreover, the following condition can also be satisfied: $3.0<(SL2-SL1)/T12<18.0$.

When a sum of central thicknesses of all lens elements of the imaging lens assembly is ΣCT, and a sum of axial distances between each of all adjacent lens elements of the imaging lens assembly is ΣAT, the following condition can be satisfied: $1.0<\Sigma CT/\Sigma AT<3.0$. Therefore, it is favorable for a tight arrangement of the lens elements so as to optimize space utilization, and thus the image capturing module is applicable to portable electronic devices.

When a maximum value among refractive indices of all lens elements of the imaging lens assembly is Nmax, the following condition is satisfied: $1.66<Nmax<1.75$. Therefore, it is favorable for the image capturing module having sufficient refractive power and flexibility for different shape designs. Moreover, the following condition can also be satisfied: $1.66<Nmax<1.70$.

According to the present disclosure, the imaging lens assembly can include seven or more lens elements. Therefore, it is favorable for increasing design flexibility so as to enhance image resolution, thereby improving image quality.

The first lens element of the imaging lens assembly can have positive refractive power, and the second lens element thereof can have negative refractive power. Therefore, it is favorable for a tight arrangement of the lens elements so as to optimize space utilization.

The imaging lens assembly can include, in order from the object side to the image side along the optical path, the first lens element, the second lens element, a third lens element, a fourth lens element, a fifth lens element, a sixth lens element and a seventh lens element. An image-side surface of the seventh lens element can be concave in a paraxial region thereof. The image-side surface of the seventh lens element can have at least one convex shape in an off-axis region thereof. Therefore, it is favorable for shortening the back focal length so as to reduce the size of the imaging lens assembly.

At least five lens elements of the imaging lens assembly can be made of plastic material. Therefore, it is favorable for increasing the flexibility of lens design and reducing manufacturing costs.

There can be no relative movement between any two adjacent lens elements of the imaging lens assembly. Therefore, it is favorable for simplifying the assembling of the imaging lens assembly so as to increase yield rate.

A maximum effective radius of the first lens element can be smaller than a maximum effective radius of a lens element which is the closest to the image side among all lens elements of the imaging lens assembly. Therefore, it is favorable for reducing the total track length so as to achieve compactness. Referring to FIG. 20 and FIG. 21, the seventh lens element E7 is the closest to the image side among all lens elements of the imaging lens assembly. Said "maximum effective radius of a lens element" refers to a larger maximum effective radius of either the object-side surface or the image-side surface of said lens element. In FIG. 20 and FIG. 21, the object-side surface of the first lens element E1 has a larger maximum effective radius than the image-side surface of the first lens element E1, so that the maximum effective radius of the first lens element E1 is interpreted as the maximum effective radius of the object-side surface of the first lens element E1. Similarly, the image-side surface of the seventh lens element E7 has a larger maximum effective radius than the object-side surface of the seventh lens element E7, so that the maximum effective radius of the seventh lens element E7 (the lens element closest to the image side) is interpreted as the maximum effective radius of the image-side surface of the seventh lens element E7.

According to the present disclosure, the aperture control unit can be disposed at an object side of the first lens element. Therefore, it is favorable for controlling the amount of incident light in the image capturing module so as to prevent mechanical interference and achieve feasibility in implementation.

When a central thickness of the first lens element is CT1, and a focal length of the first lens element is f1, the following condition can be satisfied: $0.17<CT1/f1<0.25$. Therefore, it is favorable for strengthening the ability of the first lens element to light deflection so as to control the total length of the image capturing module.

According to the present disclosure, when the image capturing module is at the first state, the aperture stop can be located at a lens barrel opening. When the image capturing module is at the second state, the aperture stop can be located at the aperture control unit. Therefore, it is favorable for simplifying the operating mechanism of the aperture control unit and enhancing the precision of controlling the amount of incident light.

According to the present disclosure, the light blocking portion of the image capturing module can be a top portion of the lens barrel, and a lens barrel opening at the top portion thereof can have a diameter from 4.0 mm to 6.5 mm. Therefore, it is favorable for properly adjusting the range of incident light. Referring to FIG. 20 and FIG. 21, the imaging lens assembly is provided in the lens barrel, the light blocking portion LS is the top portion of this lens barrel, and the diameter (Φ) of the lens barrel opening is exemplarily depicted.

When the first f-number is Fno1, and the second f-number is Fno2, the following condition can be satisfied: $0.30<Fno2-Fno1<1.20$. Therefore, it is favorable for providing different aperture sizes for different depths of field. Moreover, the following condition can also be satisfied: $0.30<Fno2-Fno1<0.90$.

When a minimum value among Abbe numbers of all lens elements of the imaging lens assembly is Vmin, the following condition can be satisfied: $10.0<Vmin<20.0$. Therefore, it is favorable for improving the refractive power of the lens element and correcting chromatic aberration.

When half of the diagonal length of the second sensing range is ImgH2, the following condition can be satisfied: 5.0 mm<ImgH2<10.0 mm. Therefore, it is favorable for a larger photosensitive area so as to enhance image brightness. Moreover, the following condition can also be satisfied: 5.50 mm<ImgH2<8.0 mm. Moreover, the following condition can also be satisfied: 6.0 mm<ImgH2<8.0 mm.

When a curvature radius of an object-side surface of a lens element closest to the image surface among all lens elements of the imaging lens assembly is RL1, and a curvature radius of an image-side surface of the lens element closest to the image surface among all lens elements of the imaging lens assembly is RL2, the following condition can be satisfied: $0.55<(RL1+RL2)/(RL1-RL2)<2.80$. Therefore, it is favorable for controlling the shape of the lens element closest to the image surface so as to optimize space utilization.

When the focal length of the imaging lens assembly is f, and a curvature radius of the image-side surface of the seventh lens element is R14, the following condition can be satisfied: $0<f/R14<3.0$. Therefore, it is favorable for controlling the total track length so as to achieve compactness.

An object-side surface of the second lens element can be convex in a paraxial region thereof, and an image-side surface of the second lens element can be concave in a paraxial region thereof. Therefore, it is favorable for correcting astigmatism so as to converge light in both the sagittal and tangential directions.

According to the present disclosure, there can be a distance in a paraxial region between any two adjacent lens elements of the imaging lens assembly. Therefore, it is favorable for simplifying the manufacturing process of the image capturing module so as to reduce assembling difficulty and improve assembling yield rate.

According to the present disclosure, each of at least three lens elements of the imaging lens assembly can have at least one inflection point. Therefore, it is favorable for correcting off-axial aberrations such as field curvature and distortion so as to enhance recognition at the periphery of the image.

According to the present disclosure, a maximum effective radius of the third lens element can be minimum among maximum effective radii of all lens elements of the imaging lens assembly. Therefore, it is favorable for controlling the effective radius of each lens element so as to block unnecessary light rays.

When the image capturing module is at the first state, an aperture diameter of the aperture control unit is D1, and the following condition can be satisfied: 5.0 mm<D1<7.0 mm. Therefore, it is favorable for preventing the aperture control unit from blocking the light entering the image capturing module so as to provide higher image brightness. Referring to FIG. 20, the parameter D1 is exemplarily depicted.

When the image capturing module is at the second state, an aperture diameter of the aperture control unit is D2, and the following condition can be satisfied: 3.0 mm<D2<5.0 mm. Therefore, it is favorable for controlling the amount of incident light so as to ensure image sharpness in every fields of view. Referring to FIG. 21, the parameter D2 is exemplarily depicted.

According to the present disclosure, the number of pixels within the first sensing range can be more than ten million, and the number of pixels within the second sensing range can be more than twenty million. Therefore, it is favorable for a better image quality so as to generate an image with more details of the imaged object.

According to the present disclosure, the image capturing module can further include a driving motor. The driving motor can be a voice coil motor so as to be favorable for capturing clear images with different object distances. The driving motor can include at least one ball so as to be favorable for a longer stroke to make the mechanism more stable in motion.

According to the present disclosure, the aforementioned features and conditions can be utilized in numerous combinations so as to achieve corresponding effects.

According to the present disclosure, the lens elements of the imaging lens assembly can be made of either glass or plastic material. When the lens elements are made of glass material, the refractive power distribution of the image capturing module may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the image capturing module can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the image capturing module, based on the corresponding image sensor, can be flat or curved, especially a curved surface being concave facing towards the object side of the image capturing module.

According to the present disclosure, an image correction unit, such as a field flattener, can be optionally disposed between the lens element closest to the image side of the image capturing module along the optical path and the image surface for correction of aberrations such as field curvature. The optical characteristics of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 24:
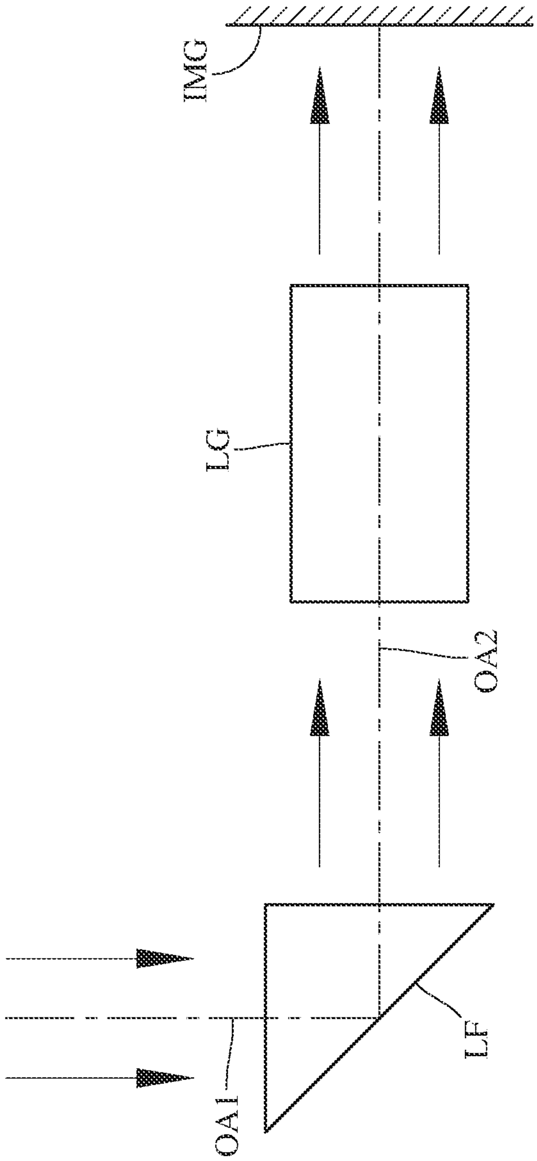
FIG. 24 shows a schematic view of a configuration of one light-folding element in an image capturing module according to one embodiment of the present disclosure.
Figure 25:
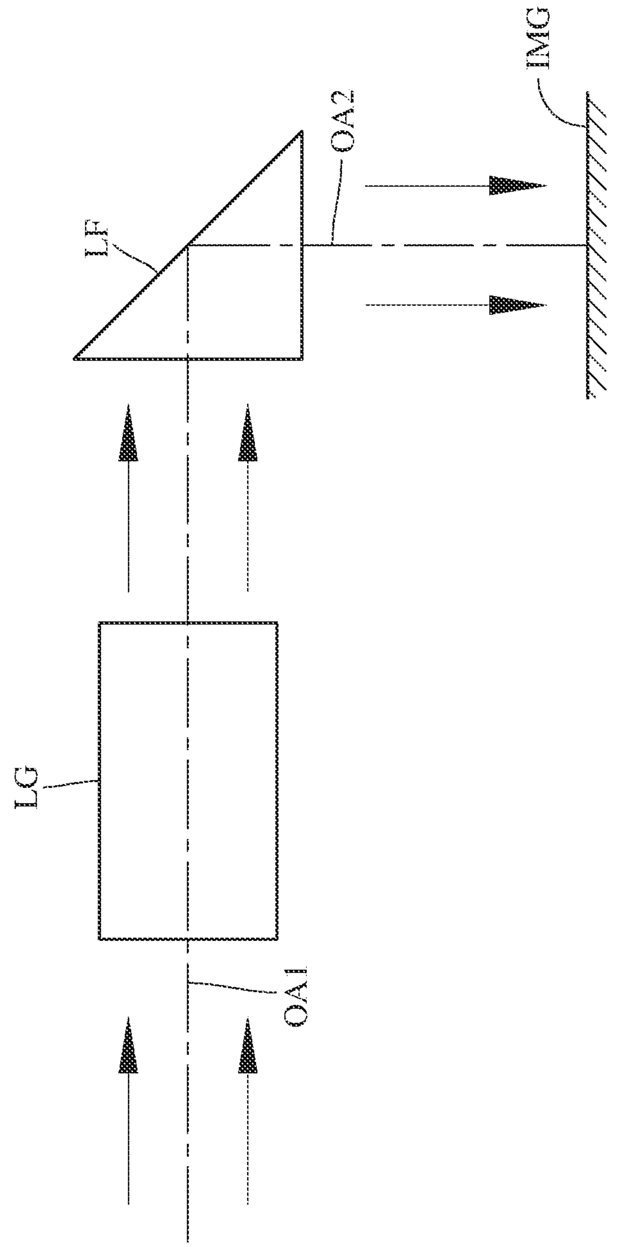
FIG. 25 shows a schematic view of another configuration of one light-folding element in an image capturing module according to one embodiment of the present disclosure.
Figure 26:
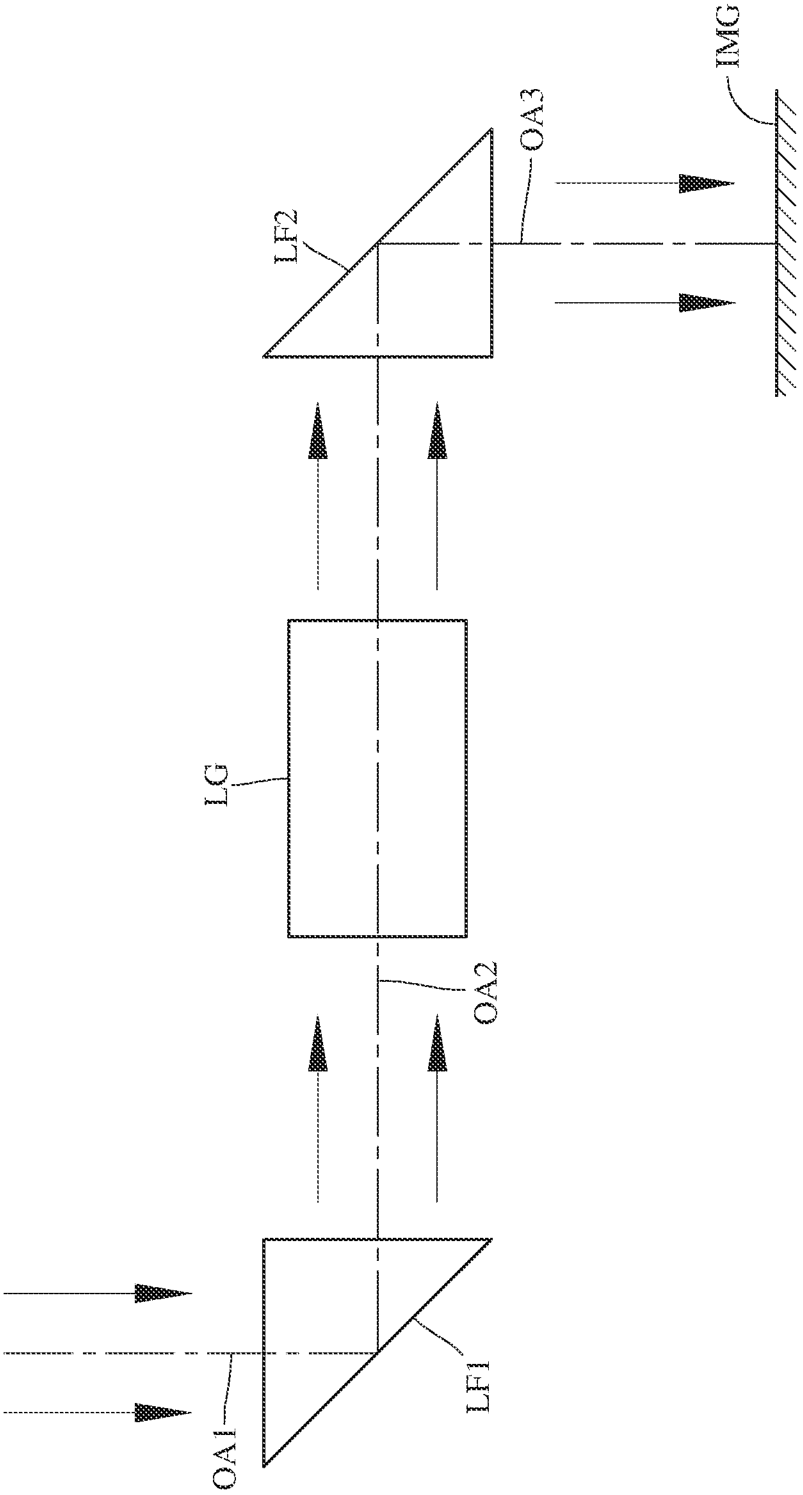
FIG. 26 shows a schematic view of a configuration of two light-folding elements in an image capturing module according to one embodiment of the present disclosure.

According to the present disclosure, at least one light-folding element, such as a prism or a mirror, can be optionally disposed between an imaged object and the image surface on the imaging optical path, and the surface shape of the prism or mirror can be planar, spherical, aspheric or freeform surface, such that the image capturing module can be more flexible in space arrangement, and therefore the dimensions of an electronic device is not restricted by the total track length of the imaging lens assembly of the image capturing module. Specifically, please refer to FIG. 24 and FIG. 25. FIG. 24 shows a schematic view of a configuration of one light-folding element in an image capturing module according to one embodiment of the present disclosure, and FIG. 25 shows a schematic view of another configuration of one light-folding element in an image capturing module according to one embodiment of the present disclosure. In FIG. 24 and FIG. 25, the image capturing module can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the image capturing module as shown in FIG. 24, or disposed between a lens group LG of the image capturing module and the image surface IMG as shown in FIG. 25. Furthermore, please refer to FIG. 26, which shows a schematic view of a configuration of two light-folding elements in an image capturing module according to one embodiment of the present disclosure. In FIG. 26, the image capturing module can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the image capturing module, the second light-folding element LF2 is disposed between the lens group LG of the image capturing module and the image surface IMG, and the traveling direction of light in the first optical axis OA1 can be the same as the traveling direction of light in the third optical axis OA3 as shown in FIG. 26. The image capturing module can be optionally provided with three or more light-folding elements, and the present disclosure is not limited to the type, amount and position of the light-folding elements of the embodiments disclosed in the aforementioned figures.

According to the present disclosure, the image capturing module can include at least one stop, such as a glare stop or a field stop. Said glare stop or field stop can be disposed between an imaged object and the first lens element, between adjacent lens elements, or between the last lens element and the image surface, and is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging lens assembly of the image capturing module and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging lens assembly and thereby provides a wider field of view for the same.

According to the present disclosure, the image capturing module can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the image capturing module can include one or more optical elements for limiting the form of light passing through the imaging lens assembly. Each optical element can be, but not limited to, a filter, a polarizer, etc., and each optical element can be, but not limited to, a single-piece element, a composite component, a thin film, etc. The optical element can be located at the object side or the image side of the image capturing module or between any two adjacent lens elements so as to allow light in a specific form to pass through, thereby meeting application requirements.

According to the present disclosure, the image capturing module can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element, a prism, a mirror, etc. The said carrier can be a base for supporting an imaging lens assembly, a micro lens disposed on an image sensor, a substrate surrounding the image sensor, a glass plate for protecting the image sensor, etc.

According to the present disclosure, the object side and image side are defined in accordance with the direction of the optical axis, and the axial optical data are calculated along the optical axis. Furthermore, if the optical axis is folded by a light-folding element, the axial optical data are also calculated along the folded optical axis.

According to the above description of the present disclosure, the following specific embodiments are provided for further explanation.

1st Embodiment

Figure 1:
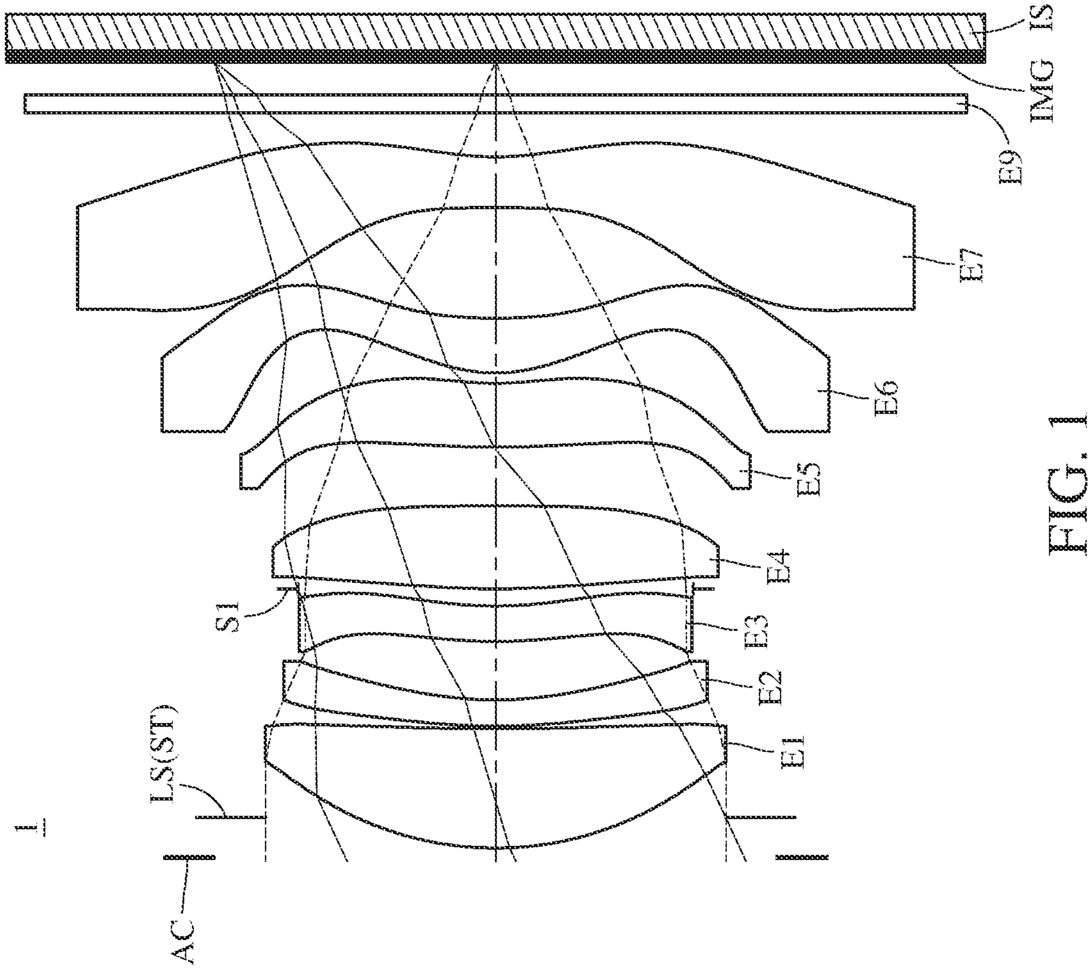
FIG. 1 is a schematic view of an image capturing module at a first state according to the 1st embodiment of the present disclosure.
Figure 2:
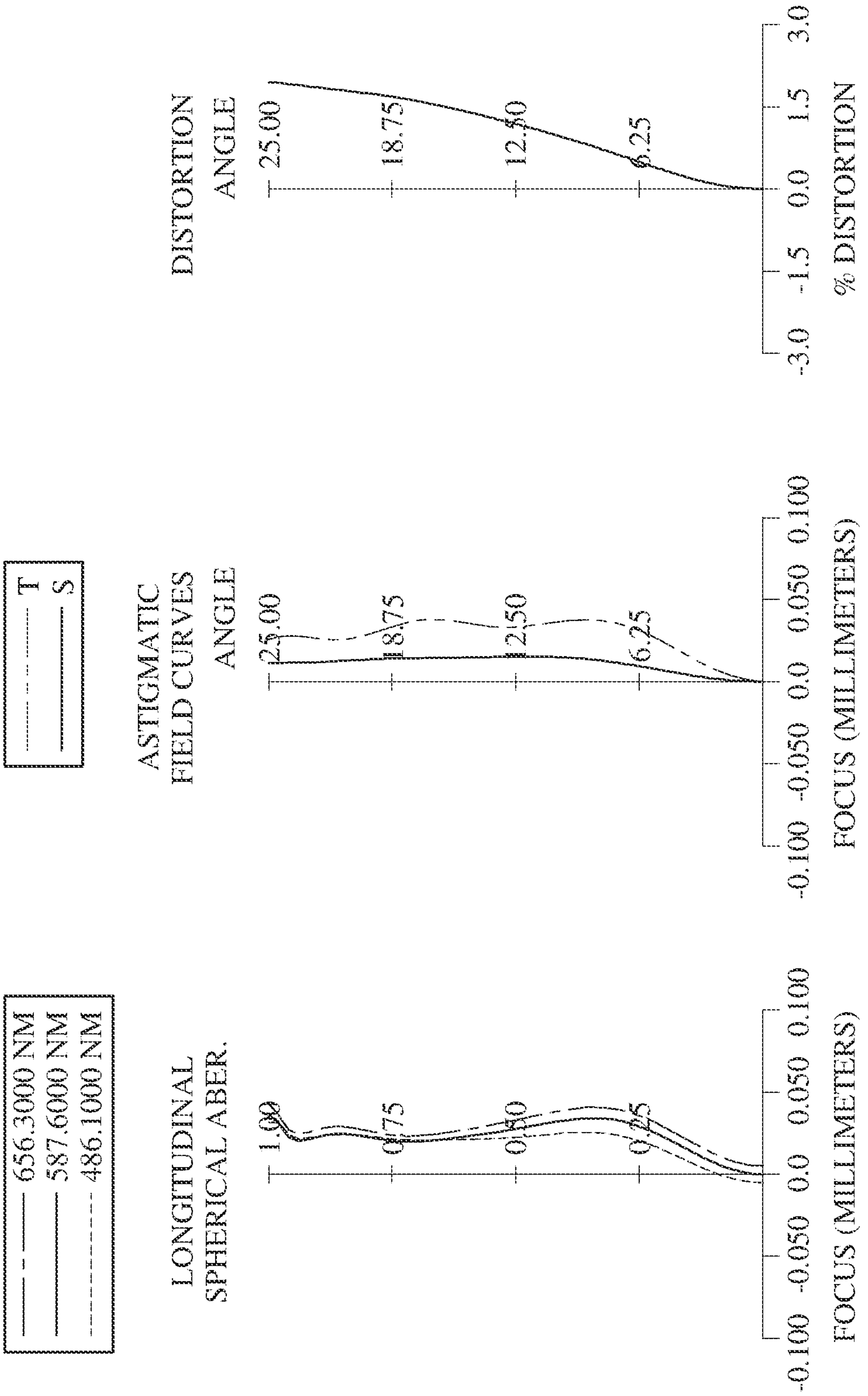
FIG. 2 shows spherical aberration curves, astigmatic field curves and a distortion curve of the image capturing module in FIG. 1.
Figure 3:
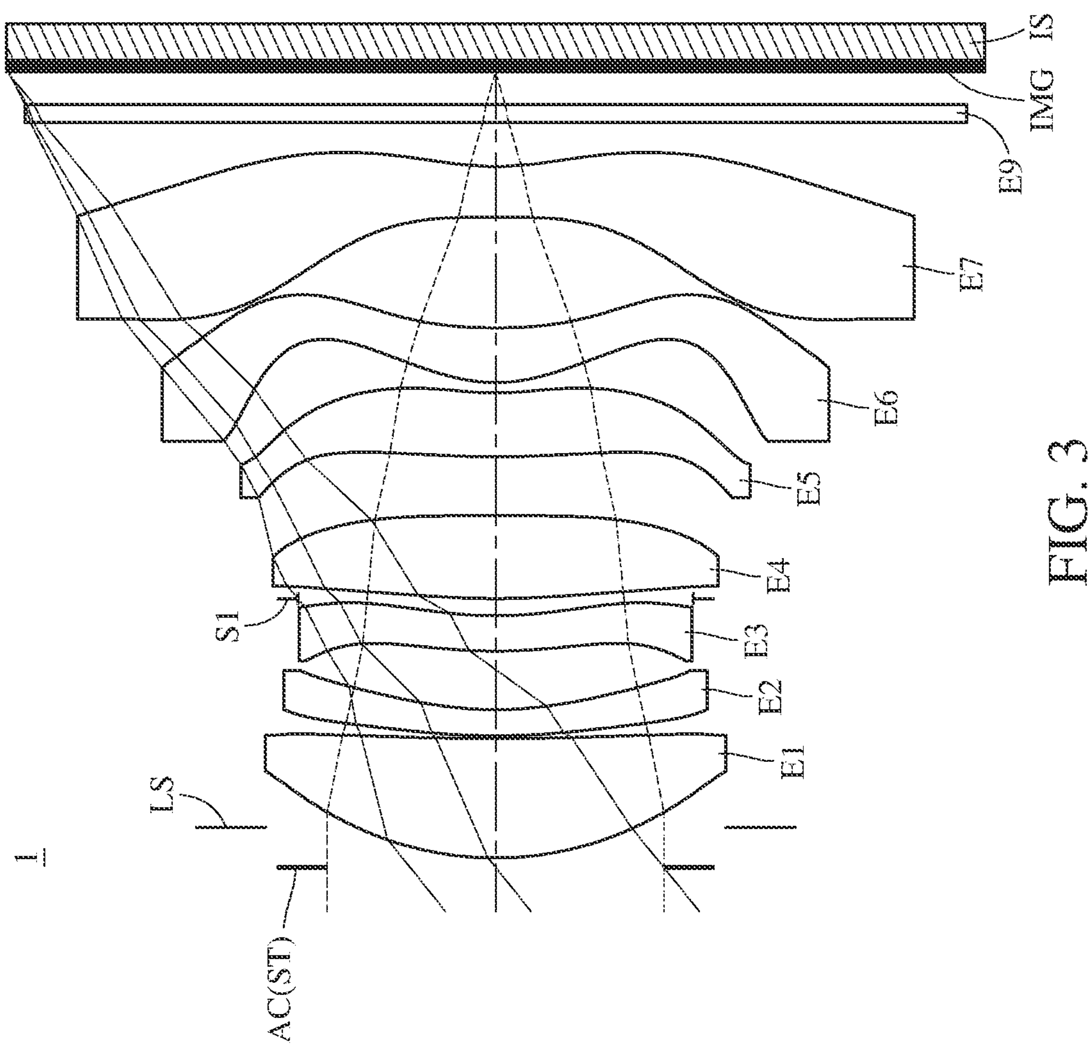
FIG. 3 is a schematic view of an image capturing module at a second state according to the 1st embodiment of the present disclosure.
Figure 4:
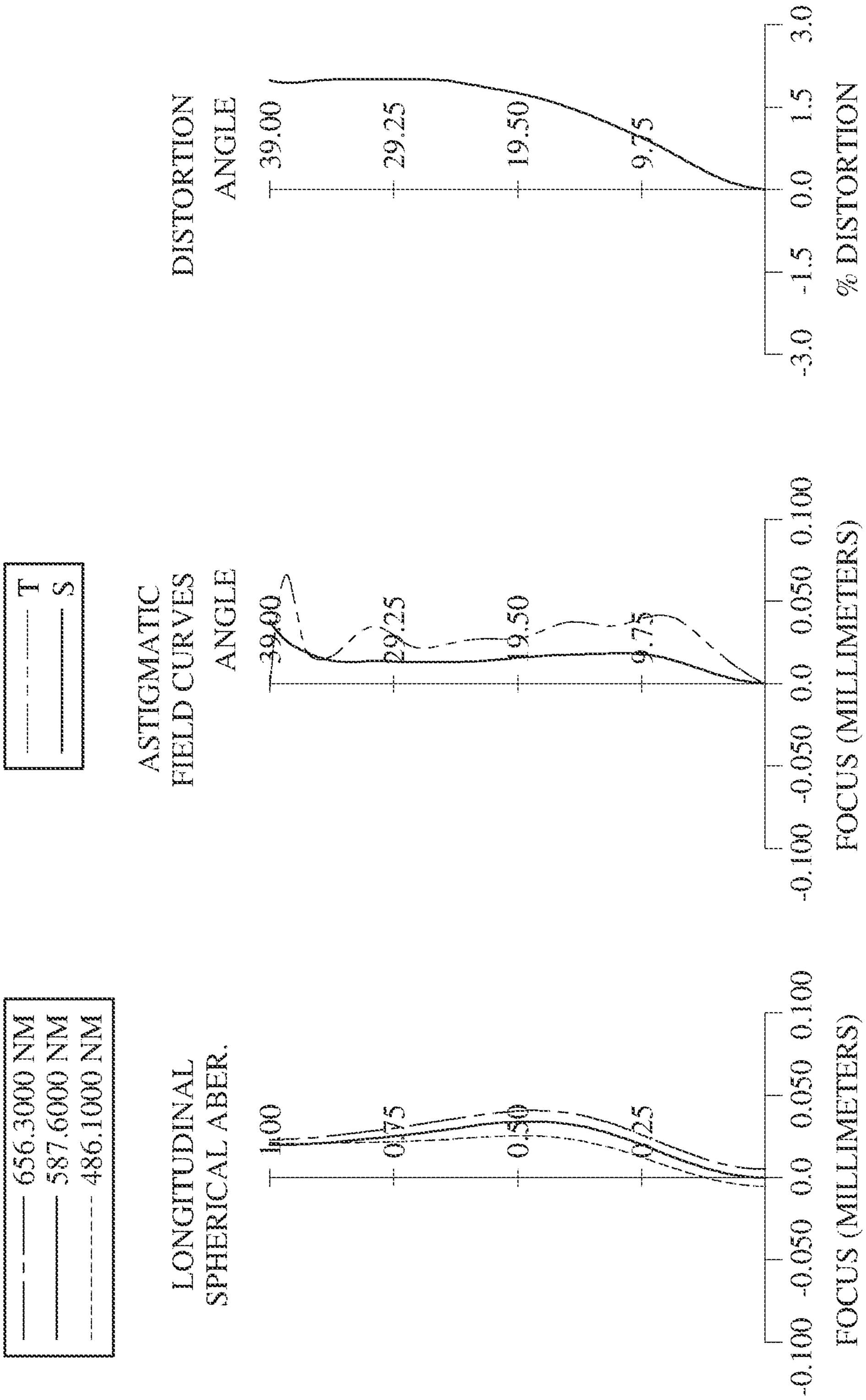
FIG. 4 shows spherical aberration curves, astigmatic field curves and a distortion curve of the image capturing module in FIG. 3.

FIG. 1 is a schematic view of an image capturing module at a first state according to the 1st embodiment of the present disclosure. FIG. 2 shows spherical aberration curves, astigmatic field curves and a distortion curve of the image capturing module in FIG. 1. FIG. 3 is a schematic view of an image capturing module at a second state according to the 1st embodiment of the present disclosure. FIG. 4 shows spherical aberration curves, astigmatic field curves and a distortion curve of the image capturing module in FIG. 3. In FIG. 1 and FIG. 3, the image capturing module 1 of the present disclosure includes an imaging lens assembly (its reference numeral is omitted) and an image sensor IS. The imaging lens assembly includes, in order from an object side to an image side along an optical path, an aperture control unit AC, a light blocking portion LS, a first lens element E1, a second lens element E2, a third lens element E3, a stop S1, a fourth lens element E4, a fifth lens element E5, a sixth lens element E6, a seventh lens element E7, an IR-cut filter E9 and an image surface IMG. The imaging lens assembly includes seven lens elements (E1, E2, E3, E4, E5, E6 and E7) with no additional lens element disposed between each of the adjacent seven lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric.

The sixth lens element E6 with positive refractive power has an object-side surface being convex in a paraxial region thereof and an image-side surface being concave in a paraxial region thereof. The sixth lens element E6 is made of plastic material and has the object-side surface and the image-side surface being both aspheric.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric.

The IR-cut filter E9 is made of glass material and located between the seventh lens element E7 and the image surface IMG, and will not affect the focal length of the imaging lens assembly. The image sensor IS is disposed on or near the image surface IMG of the imaging lens assembly.

The equation of the aspheric surface profiles of the aforementioned lens elements of the 1st embodiment is expressed as follows:

$$X(Y) = (Y^2/R)/(1 + sqrt(1 - (1 + k) \times (Y/R)^2)) + \sum_i (Ai) \times (Y^i),$$

where,

X is the displacement in parallel with the optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22, 24, and 26.

The image capturing module 1 according to the 1st embodiment has a first state and a second state. A focal length of the imaging lens assembly is substantially the same when the image capturing module 1 is at both the first state and the second state.

When the image capturing module 1 is at the first state, an aperture stop ST is located at the light blocking portion LS. In other words, an opening of the light blocking portion LS serves as the aperture stop ST of the imaging lens assembly, and the imaging lens assembly has a first f-number and a first viewing angle. When the focal length of the imaging lens assembly is f, the first f-number is Fno1, the first viewing angle is FOV1, and half of the first viewing angle is HFOV1, these parameters have the following values: f=6.73 millimeters (mm), Fno1=1.28, FOV1=50.0 degrees(deg.), and HFOV1=25.0 deg.

When the image capturing module 1 is at the second state, an aperture of the aperture control unit AC serves as the aperture stop ST of the imaging lens assembly, and the imaging lens assembly has a second f-number and a second viewing angle. When the focal length of the imaging lens assembly is f, the second f-number is Fno2, the second viewing angle is FOV2, and half of the second viewing angle is HFOV2, these parameters have the following values: f=6.73 mm, Fno2=1.75, FOV2=78.0 deg., and HFOV2=39.0 deg.

When the image capturing module 1 is at the first state, an entrance pupil diameter of the imaging lens assembly is EPD1, and the following condition is satisfied: EPD1=5.26 mm.

When the image capturing module 1 is at the second state, an entrance pupil diameter of the imaging lens assembly is EPD2, and the following condition is satisfied: EPD2=3.85 mm.

When the image capturing module 1 is at the first state, an image generated by the image capturing module 1 is within a first sensing range. When half of a diagonal length of the first sensing range is ImgH1, the following condition is satisfied: ImgH1=3.21 mm.

When the image capturing module 1 is at the second state, an image generated by the image capturing module 1 is within a second sensing range. When half of a diagonal length of the second sensing range is ImgH2, the following condition is satisfied: ImgH2=5.57 mm.

When the focal length of the imaging lens assembly is f, the entrance pupil diameter of the imaging lens assembly at the first state is EPD1, and the entrance pupil diameter of the imaging lens assembly at the second state is EPD2, the following condition is satisfied: f/(EPD1-EPD2)=4.47.

When the first viewing angle is FOV1, and the second viewing angle is FOV2, the following condition is satisfied: FOV2-FOV1=28.0 deg.

When the first f-number is Fno1, and the second f-number is Fno2, the following condition is satisfied: Fno2-Fno1=0.47.

When half of the diagonal length of the first sensing range is ImgH1, and half of the diagonal length of the second sensing range is ImgH2, the following condition is satisfied: ImgH2-ImgH1=2.36 mm.

When an axial distance between the aperture stop ST and the image surface IMG at the first state is SL1, and an axial distance between the aperture stop ST and the image surface IMG at the second state is SL2, the following condition is satisfied: SL1/SL2=0.95.

When the first f-number is Fno1, the second f-number is Fno2, the first viewing angle is FOV1, and the second viewing angle is FOV2, the following condition is satisfied: (Fno2-Fno1)/(FOV2-FOV1)=0.02 (1/degree).

When the axial distance between the aperture stop ST and the image surface IMG at the first state is SL1, the axial distance between the aperture stop ST and the image surface IMG at the second state is SL2, and an axial distance between the first lens element E1 and the second lens element E2 is T12, the following condition is satisfied: (SL2-SL1)/T12=15.27. In this embodiment, an axial distance between two adjacent lens elements is a distance in a paraxial region between two adjacent lens surfaces of the two adjacent lens elements.

When a central thickness of the first lens element E1 is CT1, and a focal length of the first lens element E1 is f1, the following condition is satisfied: CT1/f1=0.18.

When a curvature radius of an object-side surface of a lens element closest to the image surface IMG among all lens elements of the imaging lens assembly is RL1, and a curvature radius of an image-side surface of the lens element closest to the image surface IMG among all lens elements of the imaging lens assembly is RL2, the following condition is satisfied: (RL1+RL2)/(RL1-RL2)=0.83. In this embodiment, the seventh lens element E7 is the closest to the image surface IMG among the seven lens elements of the imaging lens assembly, so that RL1 is equal to a curvature radius of the object-side surface of the seventh lens element E7, and RL2 is equal to a curvature radius of the image-side surface of the seventh lens element E7.

When an axial distance between the object-side surface of the first lens element E1 and the image surface IMG is TL, and the focal length of the imaging lens assembly is f, the following condition is satisfied: TL/f=1.34.

When the focal length of the imaging lens assembly is f, and the curvature radius of the image-side surface of the seventh lens element E7 is R14, the following condition is satisfied: f/R14=2.09.

When a minimum value among Abbe numbers of all lens elements of the imaging lens assembly is Vmin, the following condition is satisfied: Vmin=19.5. In this embodiment, an Abbe number of the second lens element E2 is equal to an Abbe number of the third lens element E3, and both the second lens element E2 and the third lens element E3 have smaller Abbe number than those of the other lens elements, so that Vmin is equal to the Abbe number of the second lens element E2 or the third lens element E3.

When a maximum value among refractive indices of all lens elements of the imaging lens assembly is Nmax, the following condition is satisfied: Nmax=1.669. In this embodiment, a refractive index of the second lens element E2 is equal to a refractive index of the third lens element E3, and both the second lens element E2 and the third lens element E3 have larger refractive index than the other lens elements, so that Nmax is equal to the refractive index of the second lens element E2 or the third lens element E3.

When a sum of central thicknesses of all lens elements of the imaging lens assembly is ΣCT, and a sum of axial distances between each of all adjacent lens elements of the imaging lens assembly is ΣAT, the following condition is satisfied:

$$\Sigma CT/\Sigma AT = 1.68.$$

When the image capturing module 1 is at the first state, the aperture stop ST is located at a lens barrel opening. When a diameter of the lens barrel opening is Φ, the following condition is satisfied: Φ=5.26 mm. In this embodiment, the imaging lens assembly is provided in a lens barrel, and the opening of the light blocking portion LS serves as the aforementioned lens barrel opening.

When the image capturing module 1 is at the first state, an aperture diameter of the aperture control unit AC is D1, and the following condition is satisfied: D1=6.40 mm.

When the image capturing module 1 is at the second state, an aperture diameter of the aperture control unit AC is D2, and the following condition is satisfied:

$$D2 = 3.85 \text{ mm}.$$

The detailed optical data of the 1st embodiment are shown in Table 1A and the aspheric surface data are shown in Table 1B below.

TABLE 1A

1st Embodiment
f = 6.73 mm
Fno1 = 1.28, HFOV1 = 25.0 deg.
Fno2 = 1.75, HFOV2 = 39.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | AC | Plano | 0.458 | | | | |
| 2 | LS | Plano | −0.348 | | | | |
| 3 | Lens 1 | 3.7780 (ASP) | 1.366 | Plastic | 1.545 | 56.1 | 7.41 |
| 4 | | 50.9926 (ASP) | 0.030 | | | | |
| 5 | Lens 2 | 7.7045 (ASP) | 0.300 | Plastic | 1.669 | 19.5 | −14.64 |
| 6 | | 4.2444 (ASP) | 0.668 | | | | |
| 7 | Lens 3 | 5.5337 (ASP) | 0.405 | Plastic | 1.669 | 19.5 | −36.53 |
| 8 | | 4.3797 (ASP) | 0.197 | | | | |
| 9 | Stop | Plano | 0.001 | | | | |
| 10 | Lens 4 | 9.4640 (ASP) | 0.947 | Plastic | 1.544 | 56.0 | 16.02 |
| 11 | | −106.6731 (ASP) | 0.674 | | | | |
| 12 | Lens 5 | 11.0797 (ASP) | 0.729 | Plastic | 1.544 | 55.6 | −8.70 |
| 13 | | 3.2421 (ASP) | 0.118 | | | | |
| 14 | Lens 6 | 1.7361 (ASP) | 0.627 | Plastic | 1.544 | 56.0 | 4.06 |
| 15 | | 7.0839 (ASP) | 1.265 | | | | |
| 16 | Lens 7 | −33.6071 (ASP) | 0.580 | Plastic | 1.534 | 56.0 | −5.46 |
| 17 | | 3.2164 (ASP) | 0.500 | | | | |
| 18 | IR-cut filter | Plano | 0.210 | Glass | 1.517 | 64.2 | — |
| 19 | | Plano | 0.371 | | | | |
| 20 | Image | Plano | — | | | | |

Note:
Reference wavelength is 587.6 nm (d-line).
An effective radius of the stop S1 (Surface 9) is 2.260 mm.
At the first state, the aperture ST is located on the light blocking portion LS (Surface 2).
At the second state, the aperture ST is located on the aperture control unit AC (Surface 1).

TABLE 1B

Aspheric Coefficients

| Surface # | 2 | 3 | 4 | 5 |
|---|---|---|---|---|
| k= | −5.97470000E−02 | 9.90000000E+01 | −1.21345000E+01 | −1.59276000E+00 |
| A4= | 3.72348050E−05 | 1.28363132E−02 | 3.21128282E−03 | −1.17326187E−02 |
| A6= | 1.81528545E−04 | −1.44437600E−02 | −1.00316971E−02 | 3.61848201E−03 |
| A8= | −2.55065236E−04 | 8.65264419E−03 | 6.81501926E−03 | −1.97887456E−03 |
| A10= | 1.52454985E−04 | −3.24514071E−03 | −2.69254711E−03 | 1.07211043E−03 |
| A12= | −5.10359947E−05 | 7.63818034E−04 | 6.68699316E−04 | −4.06142021E−04 |
| A14= | 9.33938587E−06 | −1.08191478E−04 | −9.93907234E−05 | 9.45281057E−05 |
| A16= | −8.69258505E−07 | 8.34479724E−06 | 7.99251490E−06 | −1.20783778E−05 |
| A18= | 3.07968105E−08 | −2.68610519E−07 | −2.62136961E−07 | 6.60491779E−07 |

| Surface # | 6 | 7 | 9 | 10 |
|---|---|---|---|---|
| k= | −1.56579000E+01 | −4.01567000E+00 | 0.00000000E+00 | 9.90000000E+01 |
| A4= | −1.56175370E−02 | −2.47392754E−02 | −1.29954361E−02 | −1.13094632E−02 |
| A6= | 4.83964063E−03 | 8.04021938E−03 | 4.60439551E−03 | 4.22865455E−04 |
| A8= | −5.73125754E−03 | −4.56797748E−03 | −1.80659671E−03 | 6.54853011E−04 |
| A10= | 3.16512273E−03 | 1.50423421E−03 | 4.05332023E−04 | −7.61404978E−04 |
| A12= | −1.11073350E−03 | −2.44527732E−04 | −4.21381984E−06 | 3.67368469E−04 |
| A14= | 2.28682120E−04 | −1.08989903E−05 | −2.17651083E−05 | −9.52505393E−05 |
| A16= | −2.43932741E−05 | 1.32162742E−05 | 5.85473848E−06 | 1.39510627E−05 |
| A18= | 1.03877103E−06 | −2.20000748E−06 | −6.94822679E−07 | −1.09555446E−06 |
| A20= | — | 1.21313948E−07 | 3.20254214E−08 | 3.56848706E−08 |

| Surface # | 11 | 12 | 13 | 14 |
|---|---|---|---|---|
| k= | 0.00000000E+00 | 0.00000000E+00 | −2.61962000E+00 | −1.27037000E+01 |
| A4= | −2.02719920E−02 | −1.60334925E−01 | −5.63063768E−02 | 5.63950000E−02 |

TABLE 1B-continued

| Aspheric Coefficients | | | | |
|---|---|---|---|---|
| A6= | 1.37755383E−02 | 8.50428368E−02 | 4.18587224E−02 | −2.38903979E−02 |
| A8= | −8.67530759E−03 | −3.77796257E−02 | −2.25481746E−02 | 4.82954381E−03 |
| A10= | 3.77220709E−03 | 1.27260556E−02 | 7.41392426E−03 | −7.41032994E−04 |
| A12= | −1.24717879E−03 | −3.19958744E−03 | −1.59796290E−03 | 1.03024739E−04 |
| A14= | 2.95778021E−04 | 5.77868979E−04 | 2.13862435E−04 | −1.24524428E−05 |
| A16= | −4.74566942E−05 | −7.15261154E−05 | −1.36310901E−05 | 1.11008477E−06 |
| A18= | 4.80784449E−06 | 5.67335825E−06 | −4.25392523E−07 | −6.43940743E−08 |
| A20= | −2.74548479E−07 | −2.56149070E−07 | 1.40571633E−07 | 2.21706396E−09 |
| A22= | 6.69491694E−09 | 4.94410828E−09 | −9.20441562E−09 | −3.97223449E−11 |
| A24= | — | — | 2.08070309E−10 | 2.67359288E−13 |

| Surface # | 15 | 16 |
|---|---|---|
| k= | 3.93879000E+01 | −2.19359000E+00 |
| A4= | −6.22288977E−02 | −6.02890883E−02 |
| A6= | 1.53586821E−02 | 1.81039040E−02 |
| A8= | −2.72960212E−03 | −4.30827919E−03 |
| A10= | 3.46420006E−04 | 7.67314077E−04 |
| A12= | −1.60979239E−05 | −9.87309040E−05 |
| A14= | −2.64517775E−06 | 9.03360833E−06 |
| A16= | 5.57074241E−07 | −5.80394913E−07 |
| A18= | −4.94481312E−08 | 2.57216079E−08 |
| A20= | 2.55363769E−09 | −7.61799594E−10 |
| A22= | −7.94678578E−11 | 1.42077272E−11 |
| A24= | 1.38920241E−12 | −1.47881370E−13 |
| A26= | −1.05288562E−14 | 6.31589773E−16 |

In Table 1A, the curvature radius, the thickness and the focal length are shown in millimeters (mm). Surface numbers 0-20 represent the surfaces sequentially arranged from the object side to the image side along the optical axis. In Table 1B, k represents the conic coefficient of the equation of the aspheric surface profiles. A4-A26 represent the aspheric coefficients ranging from the 4th order to the 26th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 5:
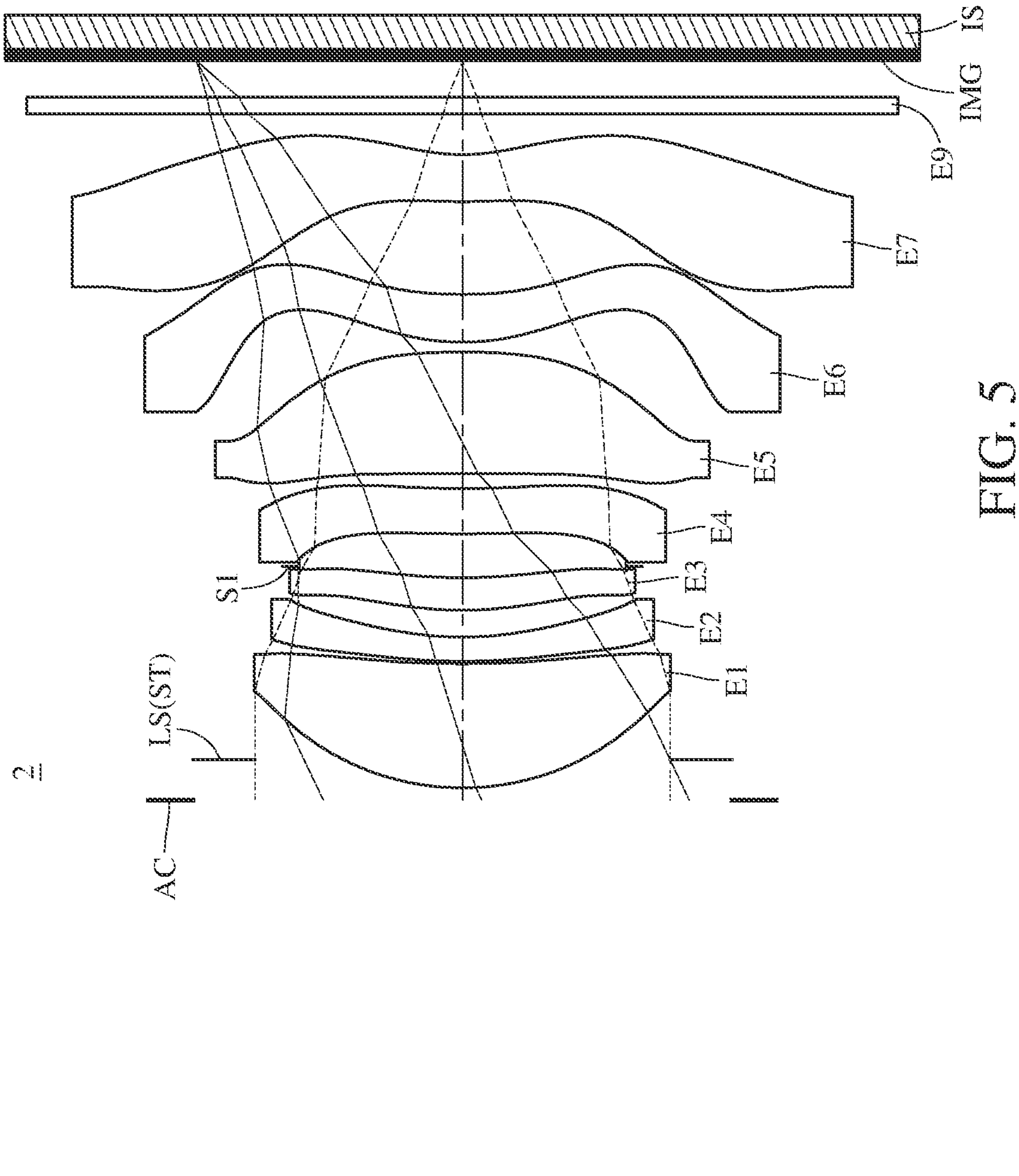
FIG. 5 is a schematic view of an image capturing module at a first state according to the 2nd embodiment of the present disclosure.
Figure 6:
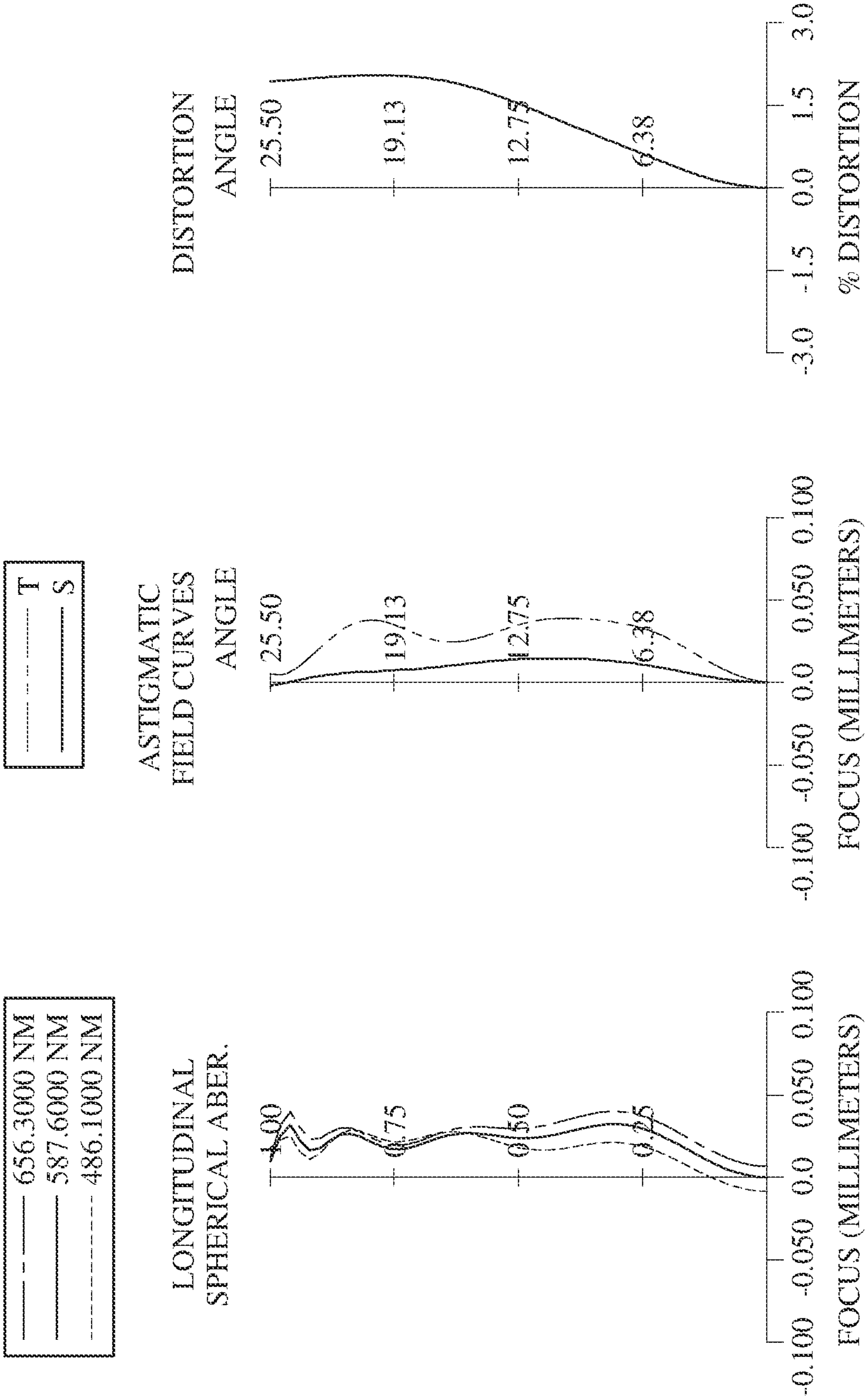
FIG. 6 shows spherical aberration curves, astigmatic field curves and a distortion curve of the image capturing module in FIG. 5.
Figure 7:
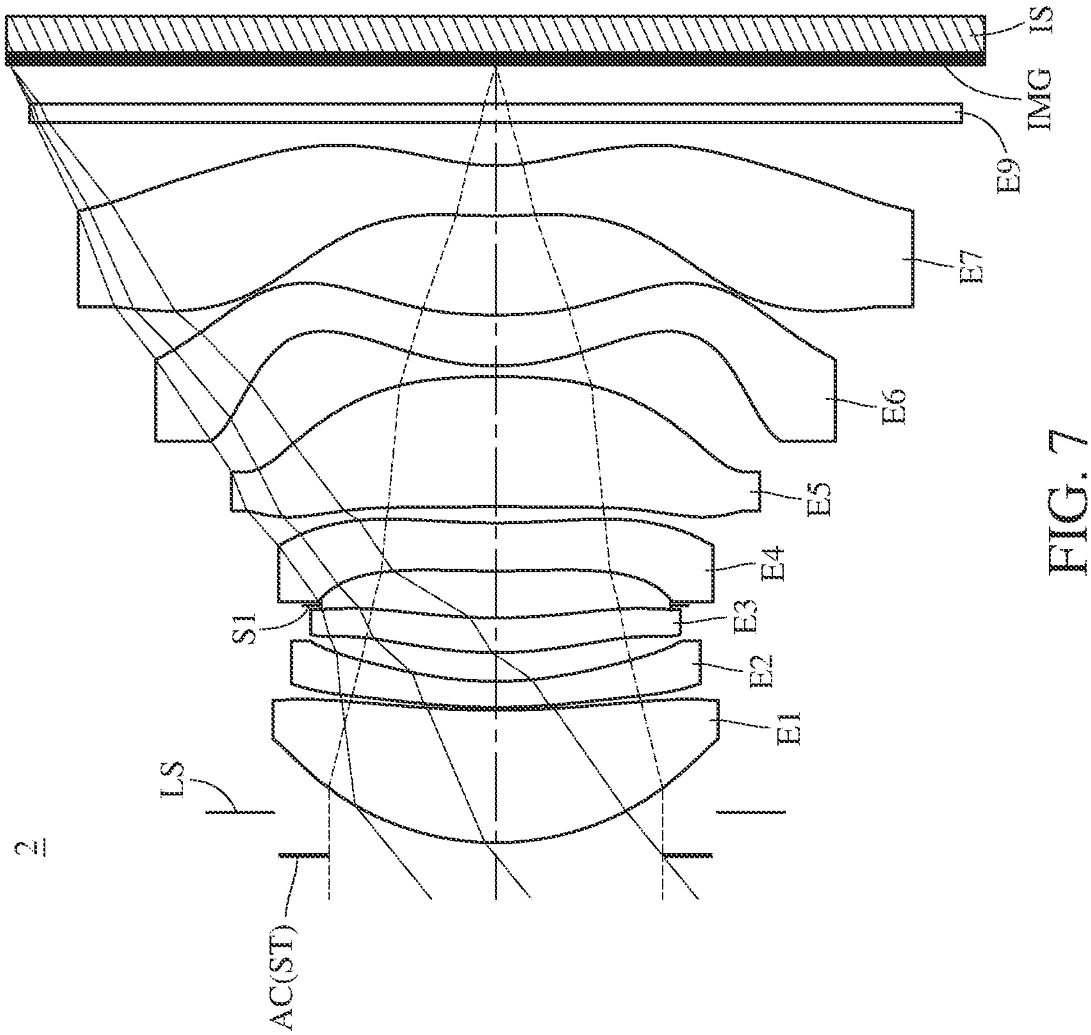
FIG. 7 is a schematic view of an image capturing module at a second state according to the 2nd embodiment of the present disclosure.
Figure 8:
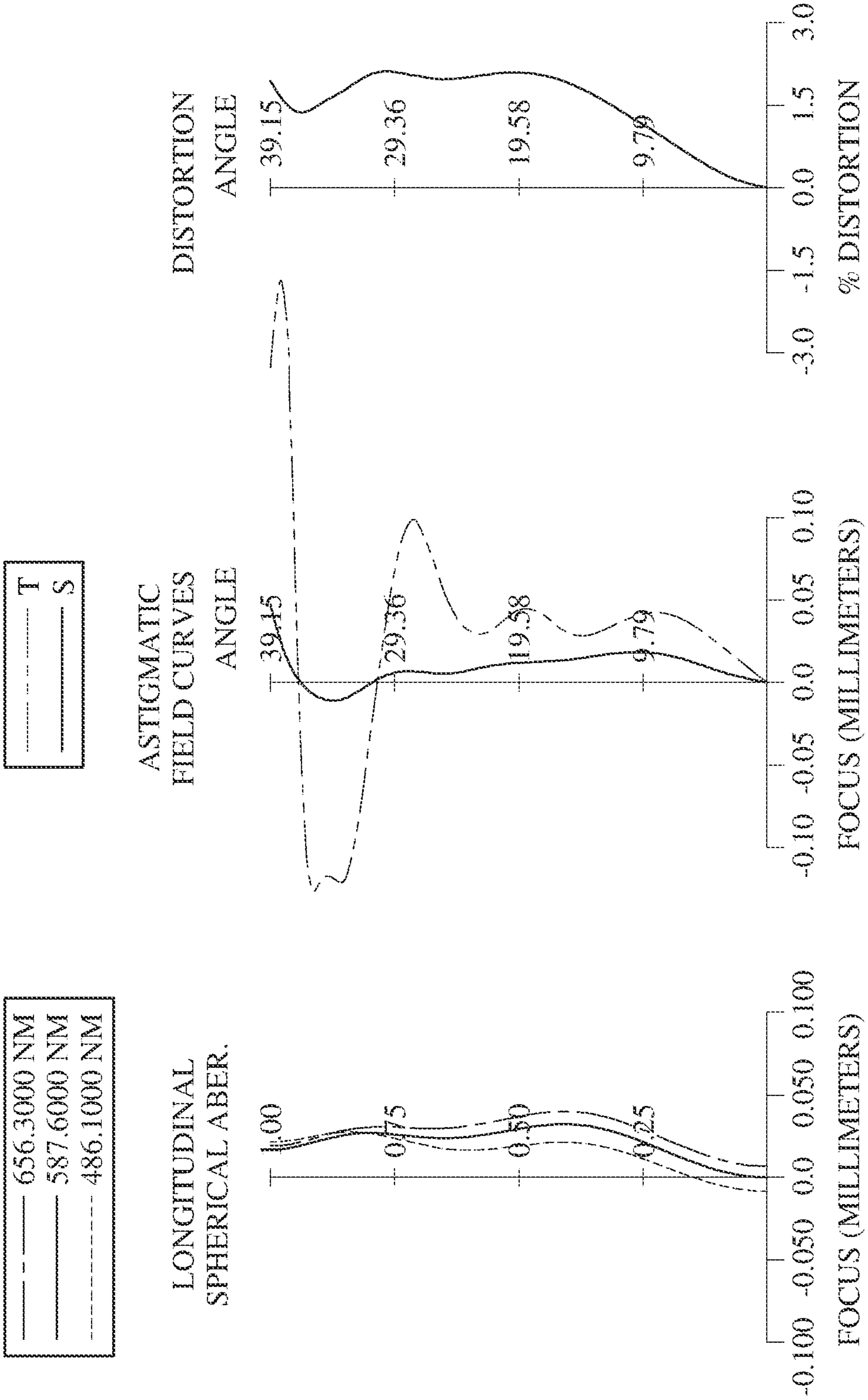
FIG. 8 shows spherical aberration curves, astigmatic field curves and a distortion curve of the image capturing module in FIG. 7.

FIG. 5 is a schematic view of an image capturing module at a first state according to the 2nd embodiment of the present disclosure. FIG. 6 shows spherical aberration curves, astigmatic field curves and a distortion curve of the image capturing module in FIG. 5. FIG. 7 is a schematic view of an image capturing module at a second state according to the 2nd embodiment of the present disclosure. FIG. 8 shows spherical aberration curves, astigmatic field curves and a distortion curve of the image capturing module in FIG. 7. In FIG. 5 and FIG. 7, the image capturing module 2 of the present disclosure includes an imaging lens assembly (its reference numeral is omitted) and an image sensor IS. The imaging lens assembly includes, in order from an object side to an image side along an optical path, an aperture control unit AC, a light blocking portion LS, a first lens element E1, a second lens element E2, a third lens element E3, a stop S1, a fourth lens element E4, a fifth lens element E5, a sixth lens element E6, a seventh lens element E7, an IR-cut filter E9 and an image surface IMG. The imaging lens assembly includes seven lens elements (E1, E2, E3, E4, E5, E6 and E7) with no additional lens element disposed between each of the adjacent seven lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with positive refractive power has an object-side surface being convex in a paraxial region thereof and an image-side surface being concave in a paraxial region thereof. The sixth lens element E6 is made of plastic material and has the object-side surface and the image-side surface being both aspheric.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric.

The IR-cut filter E9 is made of glass material and located between the seventh lens element E7 and the image surface IMG, and will not affect the focal length of the imaging lens assembly. The image sensor IS is disposed on or near the image surface IMG of the imaging lens assembly.

The detailed optical data of the 2nd embodiment are shown in Table 2A and the aspheric surface data are shown in Table 2B below.

TABLE 2A

2nd Embodiment
f = 6.74 mm
Fno1 = 1.32, HFOV1 = 25.5 deg.
Fno2 = 1.75, HFOV2 = 39.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | AC | Plano | 0.500 | | | | |
| 2 | LS | Plano | −0.350 | | | | |
| 3 | Lens 1 | 3.2854 (ASP) | 1.534 | Plastic | 1.545 | 56.1 | 7.43 |
| 4 | | 14.5267 (ASP) | 0.030 | | | | |
| 5 | Lens 2 | 8.0471 (ASP) | 0.300 | Plastic | 1.669 | 19.5 | −13.49 |
| 6 | | 4.1899 (ASP) | 0.333 | | | | |
| 7 | Lens 3 | 4.6592 (ASP) | 0.402 | Plastic | 1.544 | 56.0 | 25.34 |
| 8 | | 6.8241 (ASP) | 0.137 | | | | |
| 9 | Stop | Plano | 0.405 | | | | |
| 10 | Lens 4 | 16.9474 (ASP) | 0.557 | Plastic | 1.669 | 19.5 | −41.54 |
| 11 | | 10.3886 (ASP) | 0.186 | | | | |
| 12 | Lens 5 | −47.3075 (ASP) | 1.503 | Plastic | 1.544 | 56.0 | 20.19 |
| 13 | | −9.0155 (ASP) | 0.123 | | | | |
| 14 | Lens 6 | 3.0644 (ASP) | 0.589 | Plastic | 1.547 | 53.6 | 10.74 |
| 15 | | 5.9778 (ASP) | 1.148 | | | | |
| 16 | Lens 7 | 8.4505 (ASP) | 0.580 | Plastic | 1.534 | 56.0 | −6.19 |
| 17 | | 2.3207 (ASP) | 0.500 | | | | |
| 18 | IR-cut filter | Plano | 0.210 | Glass | 1.517 | 64.2 | — |
| 19 | | Plano | 0.456 | | | | |
| 20 | Image | Plano | — | | | | |

Note:
Reference wavelength is 587.6 nm (d-line).
An effective radius of the stop S1 (Surface 9) is 2.020 mm.
At the first state, the aperture ST is located on the light blocking portion LS (Surface 2).
At the second state, the aperture ST is located on the aperture control unit AC (Surface 1).

TABLE 2B

Aspheric Coefficients

| Surface # | 2 | 3 | 4 | 5 |
|---|---|---|---|---|
| k= | 4.46392000E−01 | 2.80477000E+01 | −1.18523000E+01 | −6.53486000E+00 |
| A4= | −8.35586874E−04 | 1.17012499E−02 | 2.93424977E−03 | −4.50763224E−03 |
| A6= | −1.29379786E−03 | −9.40693750E−03 | −1.15097311E−03 | 8.34147861E−03 |
| A8= | 1.27109565E−03 | 1.53069438E−03 | −4.33889969E−03 | −8.50605159E−03 |
| A10= | −7.49188198E−04 | 5.31301589E−04 | 3.40712183E−03 | 5.06001216E−03 |
| A12= | 2.45804223E−04 | −3.12890329E−04 | −1.17225719E−03 | −1.83718270E−03 |
| A14= | −4.65777046E−05 | 6.66854976E−05 | 2.20745027E−04 | 4.01527126E−04 |
| A16= | 4.73812741E−06 | −6.95292123E−06 | −2.19301850E−05 | −4.78167307E−05 |
| A18= | −2.05623478E−07 | 2.90404610E−07 | 8.93118515E−07 | 2.38767789E−06 |

| Surface # | 6 | 7 | 9 | 10 |
|---|---|---|---|---|
| k= | 3.11266000E+00 | 7.65394000E+00 | 3.39224000E+01 | −4.90992000E+01 |
| A4= | −1.91017610E−02 | −1.16442845E−02 | −2.24640825E−02 | −5.09198253E−03 |
| A6= | 2.40245314E−03 | −7.93607500E−03 | 1.75521388E−03 | −1.22861225E−02 |
| A8= | −2.27839168E−03 | 1.09619934E−02 | −7.27196641E−03 | 7.89679836E−03 |
| A10= | 1.13386170E−03 | −8.33076380E−03 | 9.92343399E−03 | −2.91054737E−03 |
| A12= | −6.94304484E−04 | 3.39922620E−03 | −7.00045750E−03 | 5.20522456E−04 |
| A14= | 2.39134120E−04 | −7.95967716E−04 | 2.81321697E−03 | −6.08156635E−06 |
| A16= | −3.82605865E−05 | 1.02719489E−04 | −6.57472956E−04 | −1.26248826E−05 |
| A18= | 2.35913922E−06 | −5.67030914E−06 | 8.35291910E−05 | 1.78706279E−06 |
| A20= | — | — | −4.50149114E−06 | −7.70903541E−08 |

| Surface # | 11 | 12 | 13 | 14 |
|---|---|---|---|---|
| k= | 9.06239000E+01 | 0.00000000E+00 | −7.90637000E+00 | −5.04157000E−01 |
| A4= | 1.23014651E−02 | −1.69183844E−02 | 4.32455496E−02 | 3.79971959E−02 |
| A6= | −7.94204998E−03 | −1.32919059E−02 | −3.30689401E−02 | −1.44718682E−02 |
| A8= | −1.73800837E−03 | 1.06987522E−02 | 1.51339458E−02 | 3.10455003E−04 |
| A10= | 4.68022256E−03 | −3.82002827E−03 | −5.77084505E−03 | 7.89006434E−04 |
| A12= | −3.15546895E−03 | 6.89010800E−04 | 1.62548694E−03 | −2.33280379E−04 |

TABLE 2B-continued

| Aspheric Coefficients | | | | |
|---|---|---|---|---|
| A14= | 1.16756442E−03 | −2.67146250E−05 | −3.21845968E−04 | 3.50485161E−05 |
| A16= | −2.62802200E−04 | −1.49629517E−05 | 4.40559856E−05 | −3.22104612E−06 |
| A18= | 3.69519794E−05 | 3.41116647E−06 | −4.11427231E−06 | 1.88606871E−07 |
| A20= | −3.18115468E−06 | −3.38043042E−07 | 2.51692598E−07 | −6.91371270E−09 |
| A22= | 1.53841686E−07 | 1.66239896E−08 | −9.07471091E−09 | 1.45513055E−10 |
| A24= | −3.20974321E−09 | −3.29259626E−10 | 1.45090013E−10 | −1.34803224E−12 |

| Surface # | 15 | 16 |
|---|---|---|
| k= | −1.72992000E+01 | −7.92615000E−01 |
| A4= | −8.33844446E−02 | −9.61416031E−02 |
| A6= | 2.37736329E−02 | 3.23105713E−02 |
| A8= | −5.16911478E−03 | −9.65924636E−03 |
| A10= | 6.91177279E−04 | 2.21944167E−03 |
| A12= | −2.35540083E−05 | −3.82462746E−04 |
| A14= | −7.49617695E−06 | 4.90354750E−05 |
| A16= | 1.37303139E−06 | −4.62951164E−06 |
| A18= | −1.16859301E−07 | 3.17781496E−07 |
| A20= | 5.88952133E−09 | −1.55838008E−08 |
| A22= | −1.79983922E−10 | 5.30400824E−10 |
| A24= | 3.09812779E−12 | −1.18851453E−11 |
| A26= | −2.31481370E−14 | 1.57564915E−13 |
| A28= | — | −9.36021953E−16 |

In the 2nd embodiment, the equation of the aspheric surface profiles of the aforementioned lens elements is the same as the equation of the 1st embodiment. Also, the definitions of these parameters shown in Table 2C below are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

| Values of Conditional Expressions | | | |
|---|---|---|---|
| f [mm] | 6.74 | SL1/SL2 | 0.95 |
| Fno1 | 1.32 | (Fno2 − Fno1)/(FOV2 − FOV1) [1/deg.] | 0.02 |
| Fno2 | 1.75 | (SL2 − SL1)/T12 | 16.67 |
| FOV1 [deg.] | 51.0 | CT1/f1 | 0.21 |
| FOV2 [deg.] | 78.3 | (RL1 + RL2)/(RL1 − RL2) | 1.76 |
| EPD1 [mm] | 5.13 | TL/f | 1.33 |
| EPD2 [mm] | 3.85 | f/R14 | 2.90 |
| ImgH1 [mm] | 3.29 | Vmin | 19.5 |
| ImgH2 [mm] | 5.61 | Nmax | 1.669 |
| f/(EPD1 − EPD2) | 5.29 | ΣCT/ΣAT | 2.31 |
| FOV2 − FOV1 [deg.] | 27.3 | ϕ [mm] | 5.13 |
| Fno2 − Fno1 | 0.44 | D1 [mm] | 6.60 |
| ImgH2 − ImgH1 [mm] | 2.32 | D2 [mm] | 3.85 |

3rd Embodiment

Figure 9:
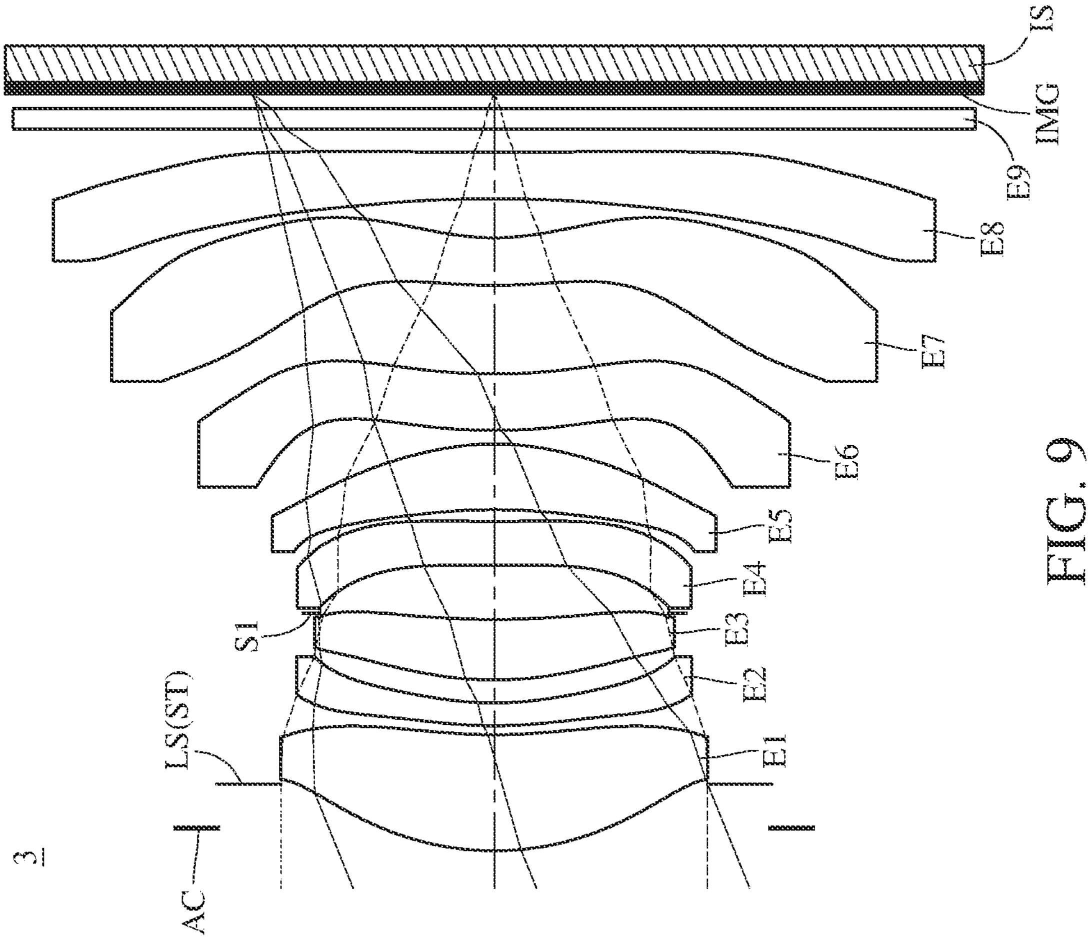
FIG. 9 is a schematic view of an image capturing module at a first state according to the 3rd embodiment of the present disclosure.
Figure 10:
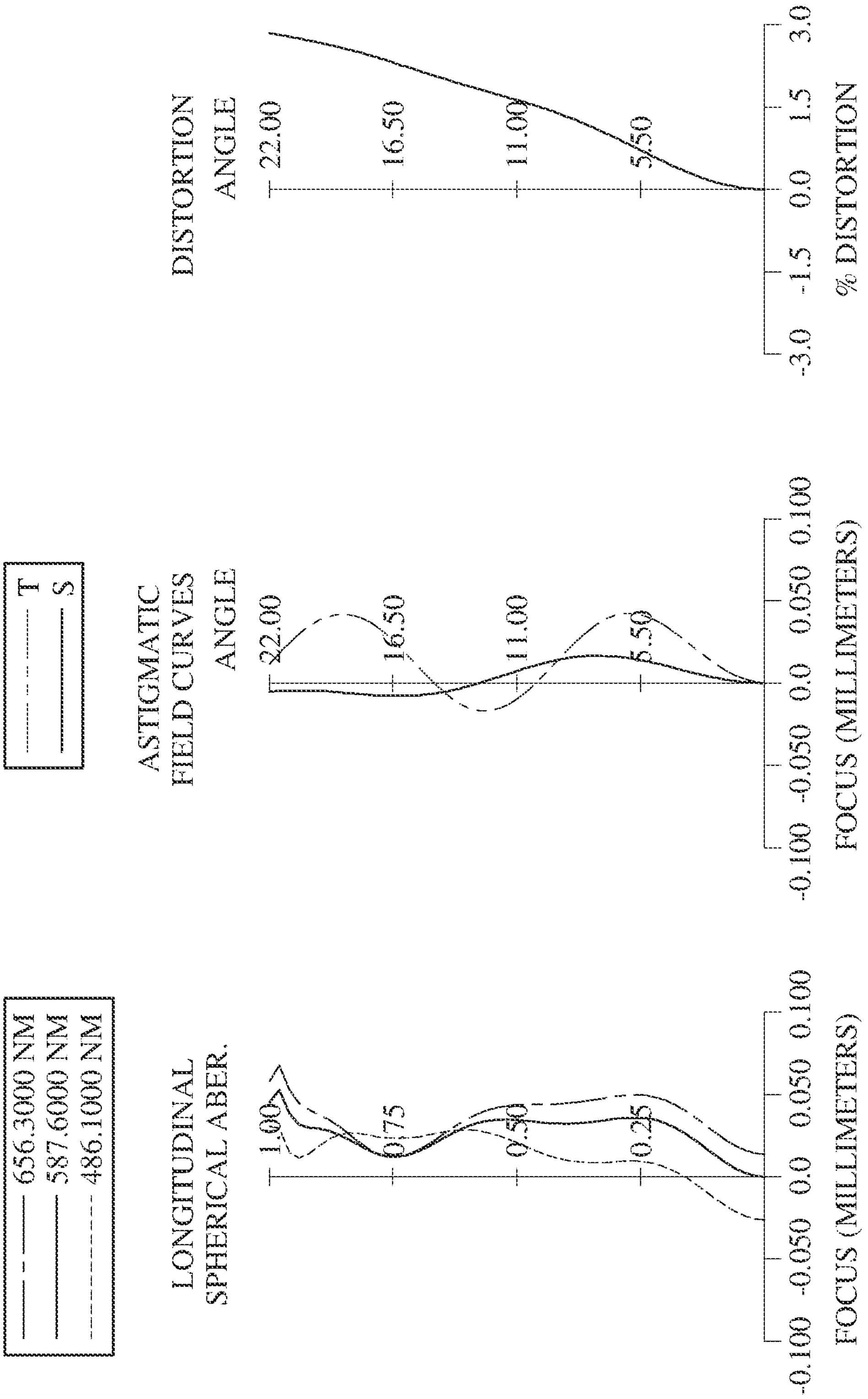
FIG. 10 shows spherical aberration curves, astigmatic field curves and a distortion curve of the image capturing module in FIG. 9.
Figure 11:
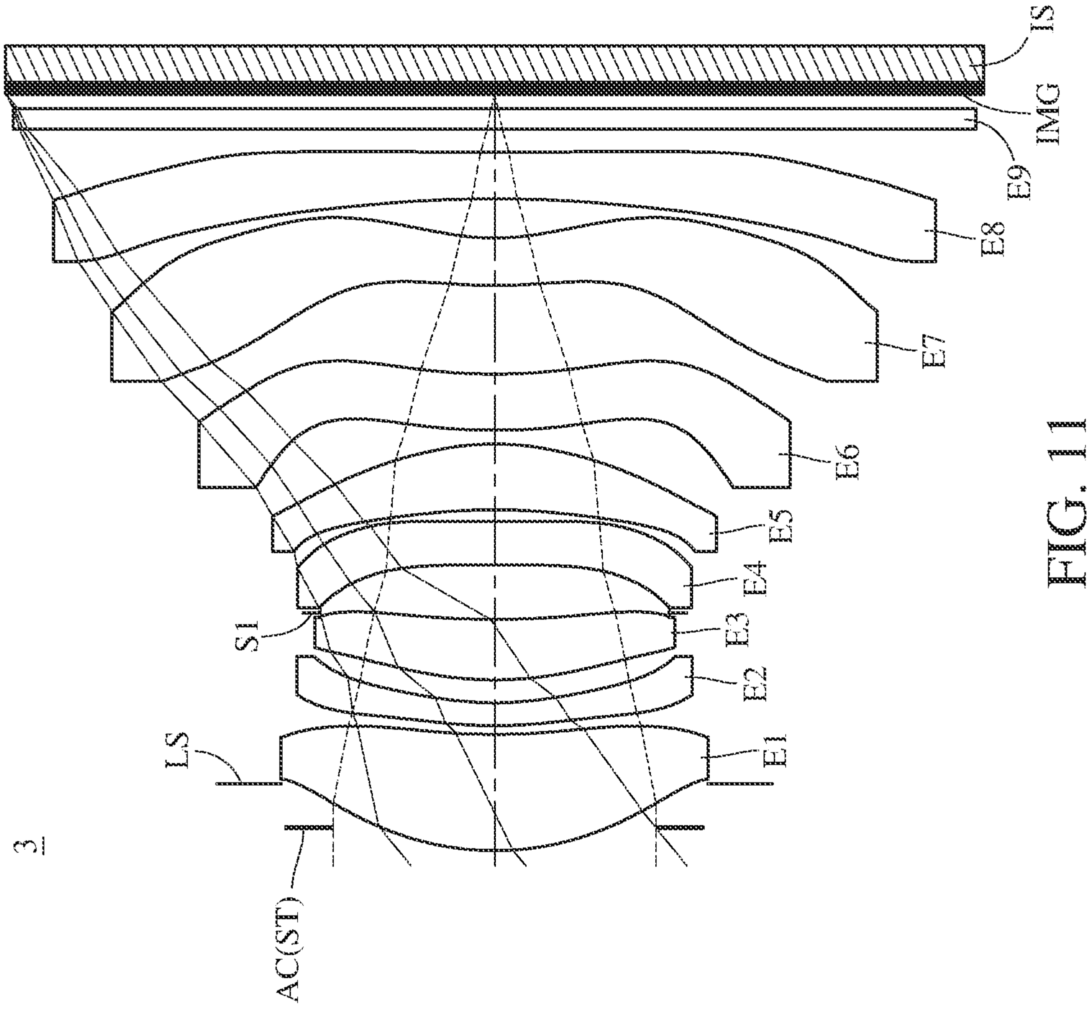
FIG. 11 is a schematic view of an image capturing module at a second state according to the 3rd embodiment of the present disclosure.
Figure 12:
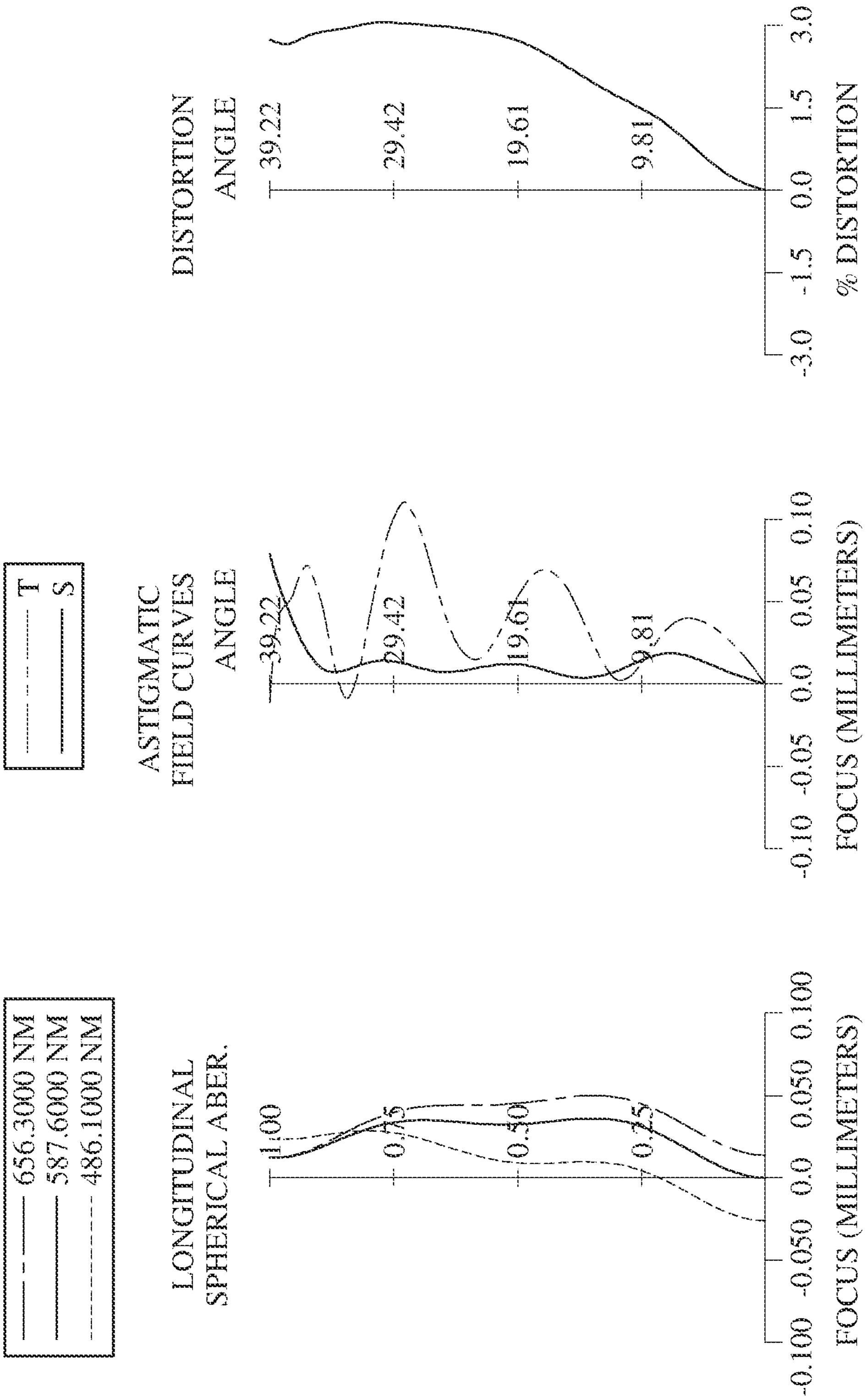
FIG. 12 shows spherical aberration curves, astigmatic field curves and a distortion curve of the image capturing module in FIG. 11.

FIG. 9 is a schematic view of an image capturing module at a first state according to the 3rd embodiment of the present disclosure. FIG. 10 shows spherical aberration curves, astigmatic field curves and a distortion curve of the image capturing module in FIG. 9. FIG. 11 is a schematic view of an image capturing module at a second state according to the 3rd embodiment of the present disclosure. FIG. 12 shows spherical aberration curves, astigmatic field curves and a distortion curve of the image capturing module in FIG. 11. In FIG. 9 and FIG. 11, the image capturing module 3 of the present disclosure includes an imaging lens assembly (its reference numeral is omitted) and an image sensor IS. The imaging lens assembly includes, in order from an object side to an image side along an optical path, an aperture control unit AC, a light blocking portion LS, a first lens element E1, a second lens element E2, a third lens element E3, a stop S1, a fourth lens element E4, a fifth lens element E5, a sixth lens element E6, a seventh lens element E7, an eighth lens element E8, an IR-cut filter E9 and an image surface IMG. The imaging lens assembly includes eight lens elements (E1, E2, E3, E4, E5, E6, E7 and E8) with no additional lens element disposed between each of the adjacent seven lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric.

The eighth lens element E8 with negative refractive power has an object-side surface being concave in a paraxial region thereof and an image-side surface being concave in a paraxial region thereof. The eighth lens element E8 is made of plastic material and has the object-side surface and the image-side surface being both aspheric.

The IR-cut filter E9 is made of glass material and located between the eighth lens element E8 and the image surface IMG, and will not affect the focal length of the imaging lens assembly. The image sensor IS is disposed on or near the image surface IMG of the imaging lens assembly.

The detailed optical data of the 3rd embodiment are shown in Table 3A and the aspheric surface data are shown in Table 3B below.

TABLE 3A

3rd Embodiment
f = 7.61 mm
Fno1 = 1.36, HFOV1 = 22.0 deg.
Fno2 = 1.80, HFOV2 = 39.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | AC | Plano | 0.577 | | | | |
| 2 | LS | Plano | −0.877 | | | | |
| 3 | Lens 1 | 3.7483 (ASP) | 1.524 | Plastic | 1.535 | 55.8 | 12.09 |
| 4 | | 7.6494 (ASP) | 0.116 | | | | |
| 5 | Lens 2 | 5.5587 (ASP) | 0.300 | Plastic | 1.671 | 19.5 | −27.03 |
| 6 | | 4.1622 (ASP) | 0.300 | | | | |
| 7 | Lens 3 | 4.4910 (ASP) | 0.794 | Plastic | 1.544 | 56.0 | 13.46 |
| 8 | | 10.8961 (ASP) | 0.083 | | | | |
| 9 | Stop | Plano | 0.633 | | | | |
| 10 | Lens 4 | −1814.2371 (ASP) | 0.571 | Plastic | 1.660 | 20.4 | −29.87 |
| 11 | | 19.9290 (ASP) | 0.153 | | | | |
| 12 | Lens 5 | −8.5649 (ASP) | 0.864 | Plastic | 1.544 | 56.0 | 9.20 |
| 13 | | −3.2708 (ASP) | 0.181 | | | | |
| 14 | Lens 6 | 10.8330 (ASP) | 0.737 | Plastic | 1.639 | 23.5 | −75.33 |
| 15 | | 8.6074 (ASP) | 1.160 | | | | |
| 16 | Lens 7 | 6.1573 (ASP) | 0.624 | Plastic | 1.535 | 55.8 | −12.31 |
| 17 | | 3.0701 (ASP) | 0.513 | | | | |
| 18 | Lens 8 | −20.1273 (ASP) | 0.613 | Plastic | 1.535 | 55.8 | −32.38 |
| 19 | | 125.5036 (ASP) | 0.300 | | | | |
| 20 | IR-cut filter | Plano | 0.270 | Glass | 1.517 | 64.2 | — |
| 21 | | Plano | 0.189 | | | | |
| 22 | Image | Plano | — | | | | |

Note:
Reference wavelength is 587.6 nm (d-line).
An effective radius of the stop S1 (Surface 9) is 2.286 mm.
At the first state, the aperture ST is located on the light blocking portion LS (Surface 2).
At the second state, the aperture ST is located on the aperture control unit AC (Surface 1).

TABLE 3B

Aspheric Coefficients

| Surface # | 2 | 3 | 4 | 5 |
|---|---|---|---|---|
| k= | −4.66424200E−02 | −3.54494300E−01 | −3.50890300E+01 | −1.17676600E+01 |
| A4= | −2.19739053E−04 | −7.70937604E−03 | 2.41744089E−03 | −1.65386933E−03 |
| A6= | −9.79979243E−05 | −1.56185331E−03 | −6.16956744E−03 | −3.46884343E−04 |
| A8= | −7.99726485E−05 | 3.27043154E−04 | 2.34914425E−03 | 4.50052547E−04 |
| A10= | 2.72676046E−05 | −5.81886196E−06 | −3.92391187E−04 | −1.59942658E−05 |
| A12= | −5.29683980E−06 | −3.51681430E−06 | 3.66641706E−05 | −9.07734124E−06 |
| A14= | 2.65723893E−07 | 2.26343362E−07 | −1.50016375E−06 | 1.25473965E−06 |

| Surface # | 6 | 7 | 9 | 10 |
|---|---|---|---|---|
| k= | −7.60983400E+00 | 1.06958800E+01 | −9.00000000E+01 | 4.69071600E+01 |
| A4= | 2.55790084E−03 | −2.96270003E−03 | −2.37613140E−02 | −4.32585910E−02 |
| A6= | −4.15166641E−04 | −3.35826755E−04 | 6.55605285E−03 | 3.08986524E−02 |
| A8= | −3.97806955E−04 | −1.07057585E−04 | −5.07452280E−03 | −1.69120831E−02 |
| A10= | 1.52150024E−04 | −6.46480548E−05 | 2.30686943E−03 | 4.84978269E−03 |
| A12= | −3.43330955E−05 | 2.04805932E−05 | −6.69416301E−04 | −7.42830608E−04 |
| A14= | 4.04626711E−06 | −2.31718022E−06 | 1.25855050E−04 | 5.70046890E−05 |

TABLE 3B-continued

| Aspheric Coefficients | | | | |
|---|---|---|---|---|
| A16= | −1.28963067E−07 | 8.45319187E−08 | −1.39136835E−05 | −1.70332085E−06 |
| A18= | — | — | 6.65758319E−07 | −1.14273737E−09 |
| Surface # | 11 | 12 | 13 | 14 |
| k= | 9.32675600E+00 | −1.04336900E+00 | 2.18727300E+00 | −3.32589800E+00 |
| A4= | −2.22484576E−02 | 3.10351965E−02 | 2.96592046E−02 | 9.94930619E−03 |
| A6= | 3.46813864E−02 | −1.73805756E−02 | −2.03093466E−02 | −6.50442959E−03 |
| A8= | −1.75234487E−02 | 6.62696771E−03 | 6.10293040E−03 | 1.23520846E−03 |
| A10= | 3.88343468E−03 | −1.76327106E−03 | −1.26302095E−03 | −1.49700406E−04 |
| A12= | −1.45042577E−04 | 3.28916757E−04 | 1.74362595E−04 | 1.11243526E−05 |
| A14= | −1.06253723E−04 | −4.16732681E−05 | −1.56384605E−05 | −4.40970626E−07 |
| A16= | 2.25915525E−05 | 3.32880599E−06 | 8.21076029E−07 | 7.05141782E−09 |
| A18= | −1.90813547E−06 | −1.44264721E−07 | −1.87724521E−08 | — |
| A20= | 6.18816664E−08 | 2.36655882E−09 | — | — |
| Surface # | 15 | 16 | 17 | 18 |
| k= | −9.00028200E+00 | −4.52839200E+00 | −6.27078700E+01 | −9.00000000E+01 |
| A4= | −3.35156893E−02 | −2.65690745E−02 | −6.36465548E−03 | −1.22518952E−04 |
| A6= | 6.00422737E−03 | 5.65848992E−03 | 2.39009978E−03 | −4.12967936E−04 |
| A8= | −1.72197057E−03 | −1.14254972E−03 | −4.31344624E−04 | 1.27200645E−04 |
| A10= | 3.69867276E−04 | 1.59210644E−04 | 4.18566416E−05 | −1.77069376E−05 |
| A12= | −4.81460277E−05 | −1.41200226E−05 | −2.29452017E−06 | 1.29368682E−06 |
| A14= | 4.03547293E−06 | 8.10265807E−07 | 6.65363787E−08 | −5.40404659E−08 |
| A16= | −2.29121621E−07 | −3.04516798E−08 | −5.38794537E−10 | 1.32161949E−09 |
| A18= | 8.98032759E−09 | 7.32428727E−10 | −2.63140470E−11 | −1.82415942E−11 |
| A20= | −2.37699405E−10 | −1.03566736E−11 | 9.25381582E−13 | 1.23199716E−13 |
| A22= | 3.86861732E−12 | 6.78523183E−14 | −1.22814125E−14 | −2.08368136E−16 |
| A24= | −2.92238653E−14 | −4.85517451E−17 | 6.25142514E−17 | −9.37574460E−19 |

In the 3rd embodiment, the equation of the aspheric surface profiles of the aforementioned lens elements is the same as the equation of the 1st embodiment. Also, the definitions of these parameters shown in Table 3C below are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

| Values of Conditional Expressions | | | |
|---|---|---|---|
| f [mm] | 7.61 | SL1/SL2 | 0.94 |
| Fno1 | 1.36 | (Fno2 − Fno1)/(FOV2 − FOV1) [1/deg.] | 0.01 |
| Fno2 | 1.80 | (SL2 − SL1)/T12 | 4.97 |
| FOV1 [deg.] | 44.0 | CT1/f1 | 0.13 |
| FOV2 [deg.] | 78.4 | (RL1 + RL2)/(RL1 − RL2) | −0.72 |
| EPD1 [mm] | 5.60 | TL/f | 1.30 |
| EPD2 [mm] | 4.23 | f/R14 | 2.48 |
| ImgH1 [mm] | 3.18 | Vmin | 19.5 |
| ImgH2 [mm] | 6.40 | Nmax | 1.671 |
| f/(EPD1 − EPD2) | 5.56 | ΣCT/ΣAT | 1.92 |
| FOV2 − FOV1 [deg.] | 34.4 | ϕ [mm] | 5.60 |
| Fno2 − Fno1 | 0.44 | D1 [mm] | 7.20 |
| ImgH2 − ImgH1 [mm] | 3.22 | D2 [mm] | 4.23 |

4th Embodiment

Figure 13:
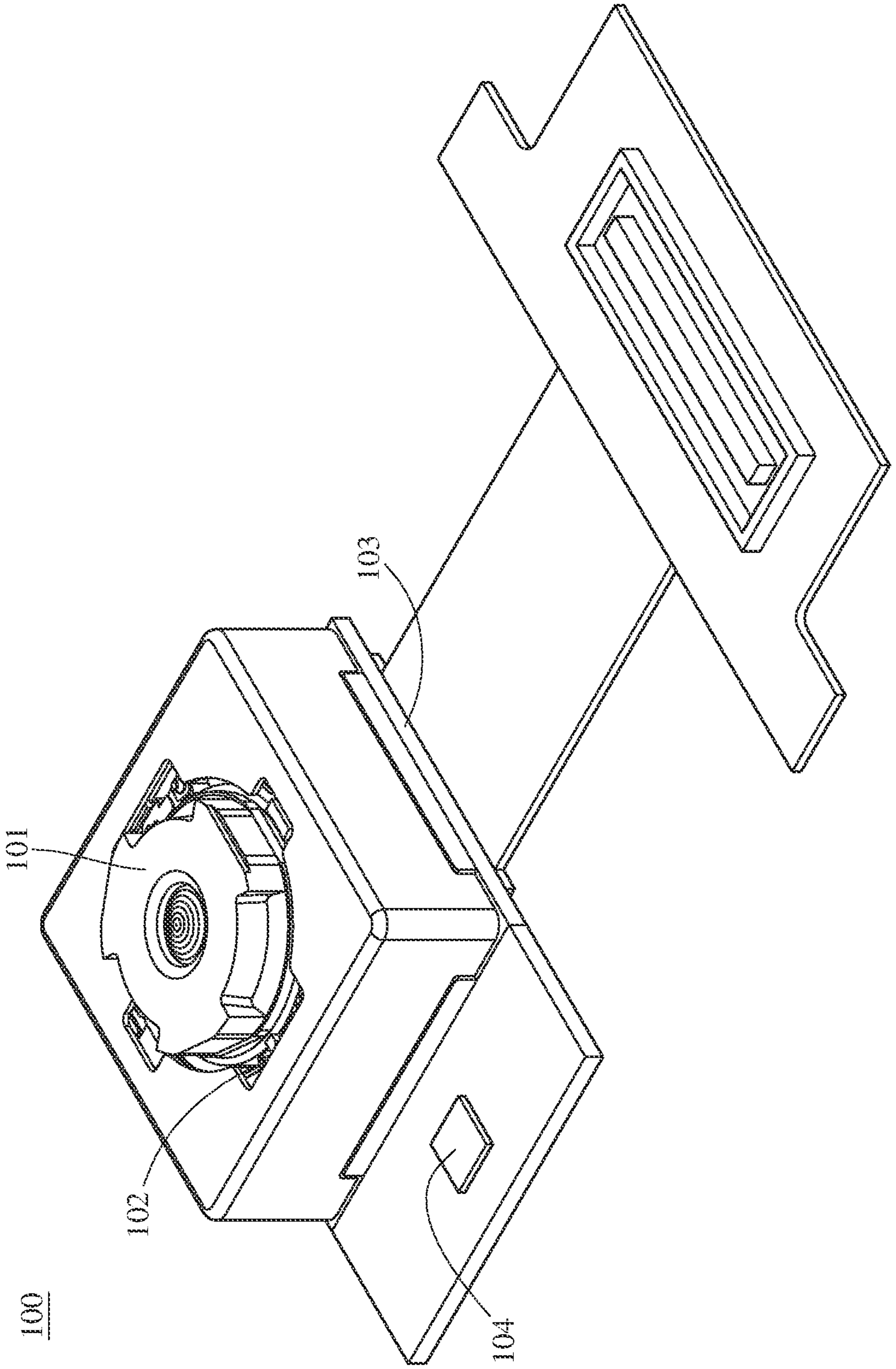
FIG. 13 is a perspective view of an image capturing unit according to the 4th embodiment of the present disclosure.

FIG. 13 is a perspective view of an image capturing unit according to the 4th embodiment of the present disclosure. In this embodiment, an image capturing unit 100 is a camera module including a lens unit 101, a driving device 102, an image sensor 103 and an image stabilizer 104. The image capturing unit 100 includes the image capturing module as disclosed in the 1st embodiment. The lens unit 101 includes a barrel and a holder member (their reference numerals are omitted) for holding the imaging lens assembly of the image capturing module. However, the lens unit 101 may alternatively be provided within the image capturing module disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems or shape memory alloy materials. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the imaging lens assembly to provide higher image quality.

The image stabilizer 104, such as an accelerometer, a gyro sensor and a Hall Effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

Figure 22:
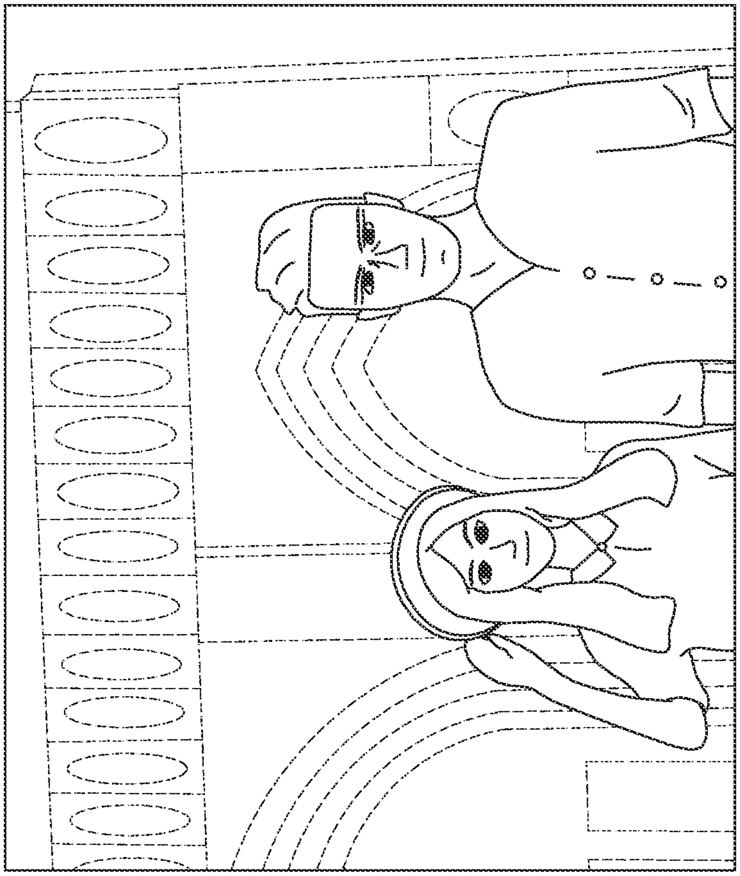
FIG. 22 is a schematic view of an image captured by the image capturing unit in FIG. 13 with the image capturing module at the first state.
Figure 23:
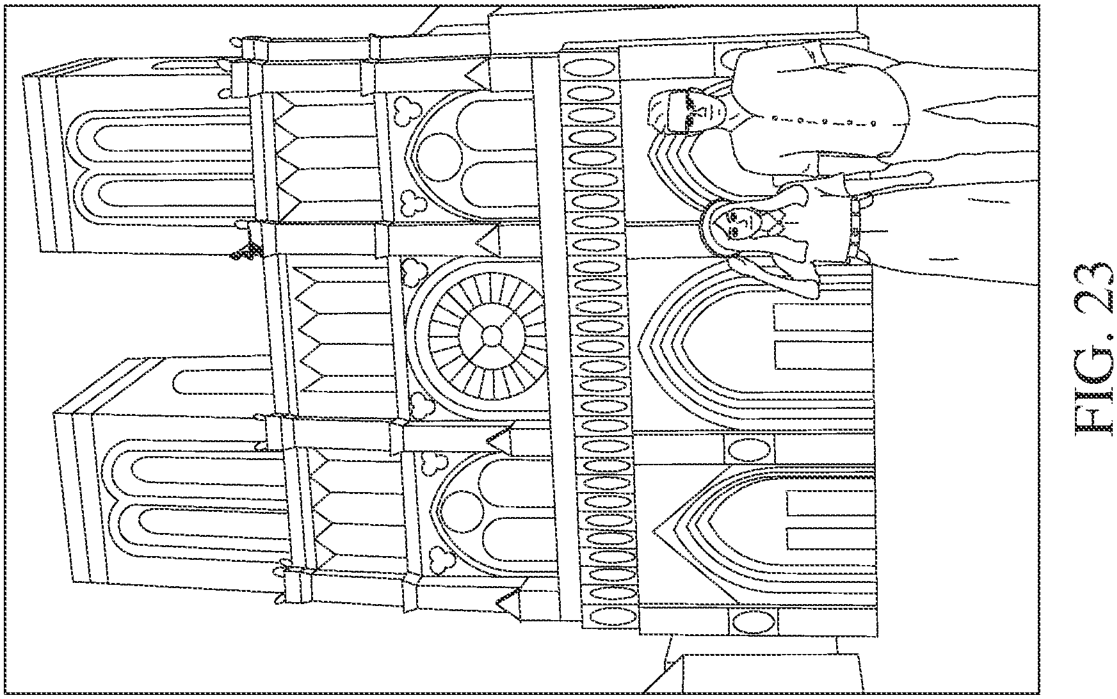
FIG. 23 is a schematic view of an image captured by the image capturing unit in FIG. 13 with the image capturing module at the second state.

Since the image capturing module has at least two states for photography, the image capturing unit 100 in this embodiment can provide various magnification ratios by switching the state of the image capturing module to meet the requirement of optical zoom functionality. For example, when the image capturing module is at the first state, the image capturing unit 100 has a narrower field of view, and the image captured by the image capturing unit 100 enjoys a feature of high optical magnification and encompasses part of the building and persons in front of the building, as shown in FIG. 22. When the image capturing module is at the second state, the image capturing unit 100 has a wider field of view, and the image captured by the image capturing unit 100 enjoys a feature of multiple imaged objects and encompasses the entire of the building, as shown in FIG. 23.

5th Embodiment

Figure 14:
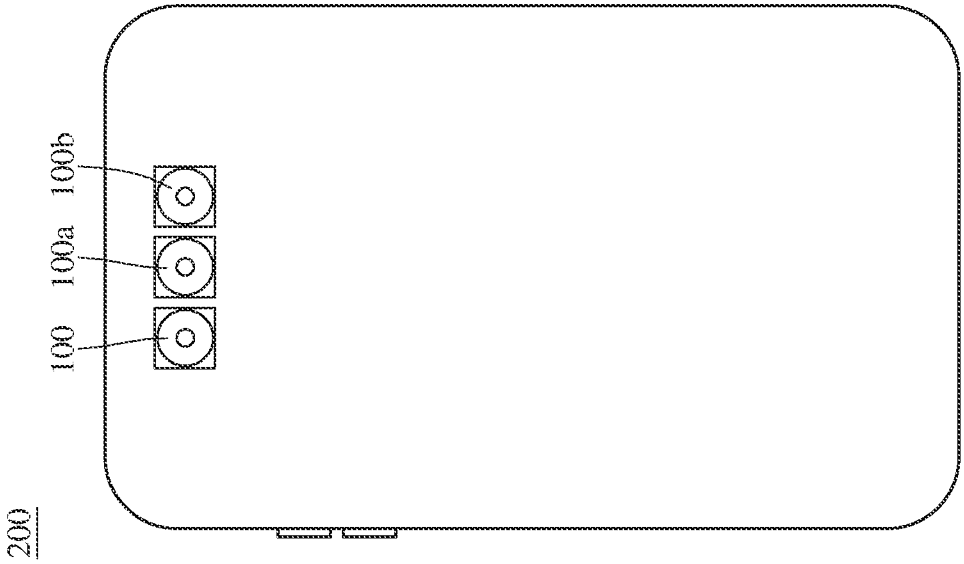
FIG. 14 is one perspective view of an electronic device according to the 5th embodiment of the present disclosure.
Figure 15:
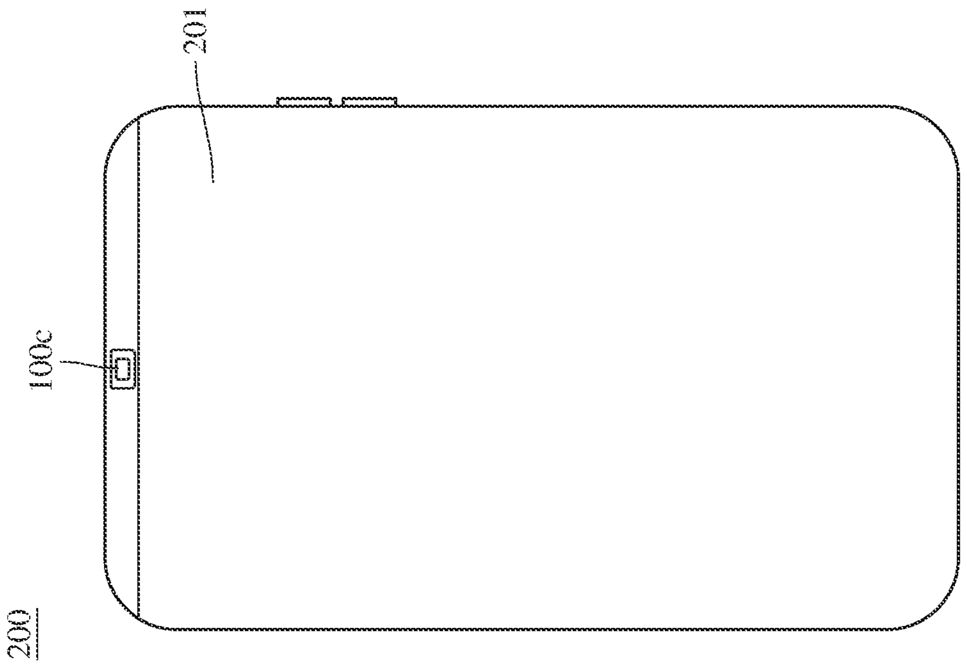
FIG. 15 is another perspective view of the electronic device in FIG. 14.

FIG. 14 is one perspective view of an electronic device according to the 5th embodiment of the present disclosure. FIG. 15 is another perspective view of the electronic device in FIG. 14.

In this embodiment, an electronic device 200 is a smartphone including the image capturing unit 100, an image capturing unit 100*a*, an image capturing unit 100*b*, an image capturing unit 100*c* and a display module 201. The image capturing unit 100 can include any one of the image capturing module disclosed in the aforementioned embodiments. As shown in FIG. 14, the image capturing unit 100, the image capturing unit 100*a* and the image capturing unit 100*b* are disposed on the same side of the electronic device 200. As shown in FIG. 15, the image capturing unit 100*c* and the display module 201 are disposed on the opposite side of the electronic device 200. The image capturing unit 100*c* can be a front-facing camera of the electronic device 200 for taking selfies, but the present disclosure is not limited thereto. Furthermore, each of the image capturing units 100, 100*a* and 100*b* can include an image stabilizer, a barrel and a holder member for holding the imaging lens assembly of the image capturing module.

The image capturing unit 100 is a telephoto image capturing unit, the image capturing unit 100*a* is a wide-angle image capturing unit, the image capturing unit 100*b* is an ultra-wide-angle image capturing unit, and the image capturing unit 100*c* is a wide-angle image capturing unit. In this embodiment, the image capturing units 100, 100*a* and 100*b* have different fields of view, such that the electronic device 200 can have various magnification ratios so as to meet the requirement of optical zoom functionality for various applications with different requirements. The image capturing unit 100*c* can have a non-circular opening, and optical components in the image capturing unit 100*c* can have trimmed edges at their outermost positions so as to coordinate with the shape of the non-circular opening. Therefore, it is favorable for reducing the size of the image capturing unit 100*c* so as to increase the ratio of the area of the display module 201 relative to that of the electronic device 200, and reduce the thickness of the electronic device 200. In this embodiment, the electronic device 200 includes multiple image capturing units 100, 100*a*, 100*b* and 100*c*, but the present disclosure is not limited to the number and arrangement of image capturing units.

6th Embodiment

Figure 16:
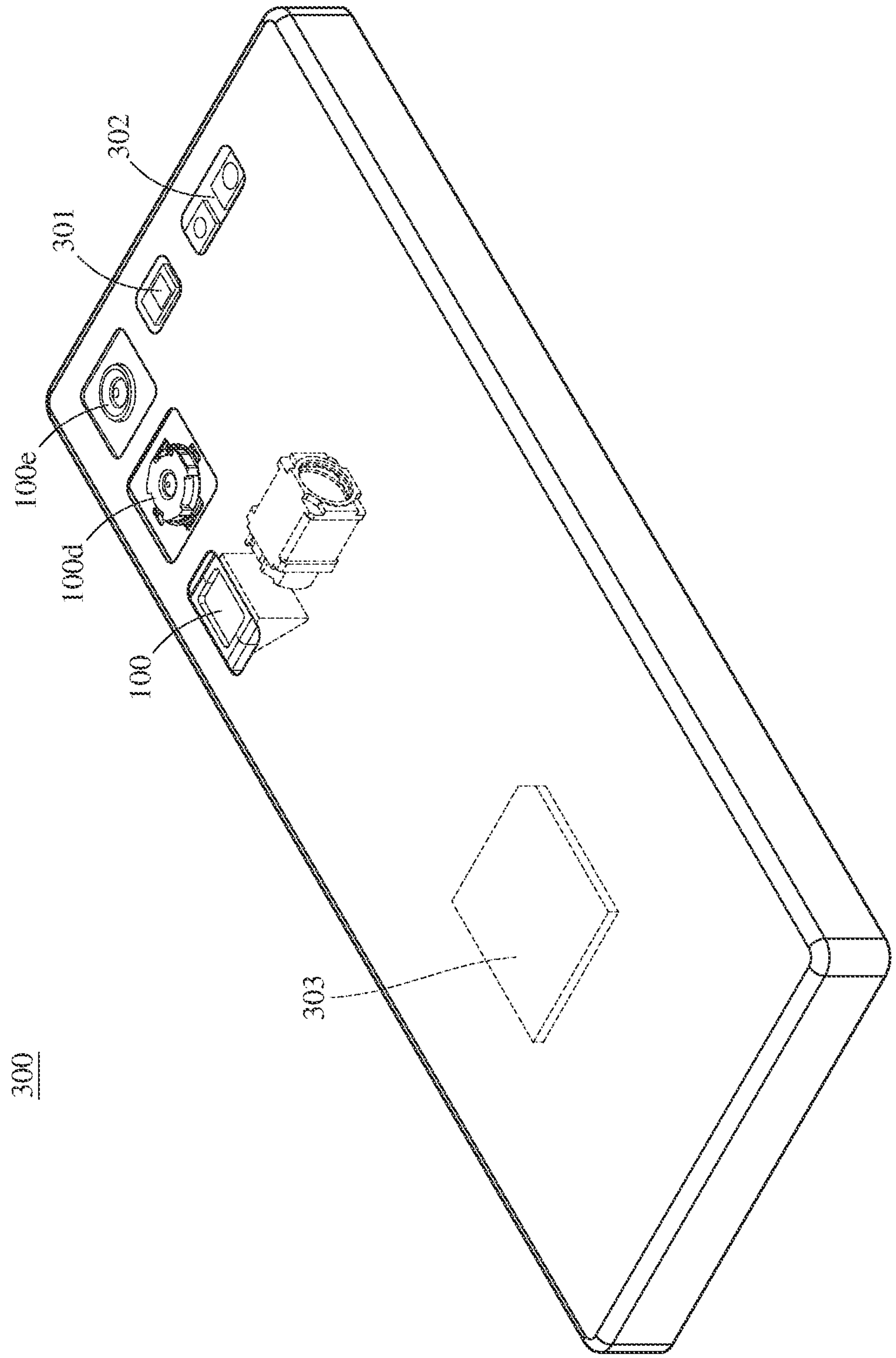
FIG. 16 is one perspective view of an electronic device according to the 6th embodiment of the present disclosure.
Figure 17:
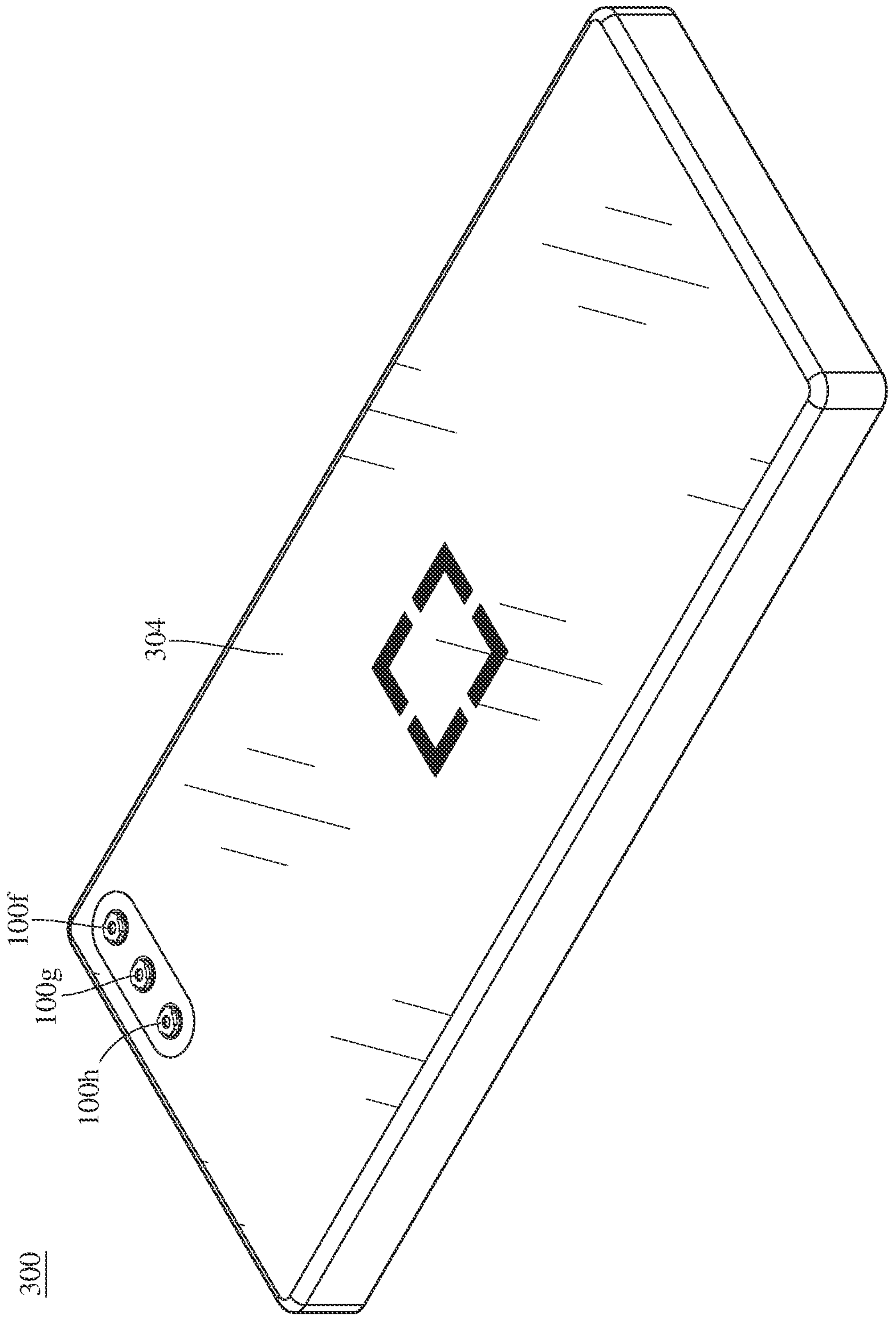
FIG. 17 is another perspective view of the electronic device in FIG. 16.
Figure 18:
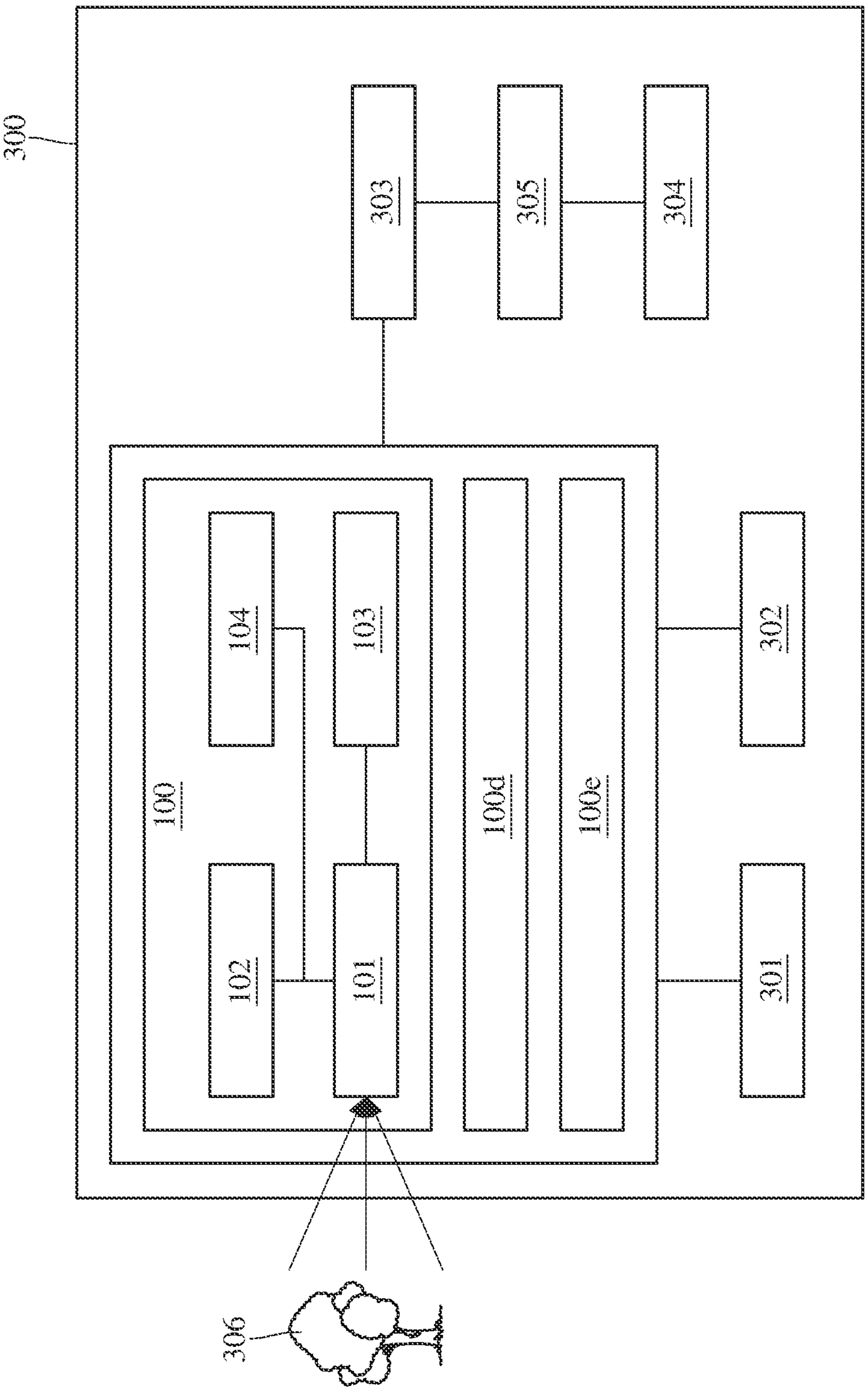
FIG. 18 is a block diagram of the electronic device in FIG. 16.

FIG. 16 is one perspective view of an electronic device according to the 6th embodiment of the present disclosure. FIG. 17 is another perspective view of the electronic device in FIG. 16. FIG. 18 is a block diagram of the electronic device in FIG. 16.

In this embodiment, an electronic device 300 is a smartphone including the image capturing unit 100 disclosed in the 4th embodiment, an image capturing unit 100*d*, an image capturing unit 100*e*, an image capturing unit 100*f*, an image capturing unit 100*g*, an image capturing unit 100*h*, a flash module 301, a focus assist module 302, an image signal processor 303, a display module 304 and an image software processor 305. The image capturing unit 100, the image capturing unit 100*d* and the image capturing unit 100*e* are disposed on the same side of the electronic device 300. The focus assist module 302 can be a laser rangefinder or a ToF (time of flight) module, but the present disclosure is not limited thereto. The image capturing unit 100*f*, the image capturing unit 100*g*, the image capturing unit 100*h* and the display module 304 are disposed on the opposite side of the electronic device 300, and the display module 304 can be a user interface, such that the image capturing units 100*f*, 100*g*, 100*h* can be front-facing cameras of the electronic device 300 for taking selfies, but the present disclosure is not limited thereto. Furthermore, each of the image capturing units 100*d*, 100*e*, 100*f*, 100*g* and 100*h* can include the image capturing module of the present disclosure and can have a configuration similar to that of the image capturing unit 100. In detail, each of the image capturing units 100*d*, 100*e*, 100*f*, 100*g* and 100*h* can include a lens unit, a driving device, an image sensor and an image stabilizer, and each of the lens unit can include the image capturing module of the present disclosure, a barrel and a holder member for holding the imaging lens assembly of the image capturing module. Each of the image capturing units 100*d*, 100*e*, 100*f*, 100*g* and 100*h* can also include a reflective element as a light-folding element.

The image capturing unit 100 is a telephoto image capturing unit having a light-folding element configuration, the image capturing unit 100*d* is a wide-angle image capturing unit, the image capturing unit 100*e* is an ultra-wide-angle image capturing unit, the image capturing unit 100*f* is a wide-angle image capturing unit, the image capturing unit 100*g* is an ultra-wide-angle image capturing unit, and the image capturing unit 100*h* is a ToF image capturing unit. In this embodiment, the image capturing units 100, 100*d* and 100*e* have different fields of view, such that the electronic device 300 can have various magnification ratios so as to meet the requirement of optical zoom functionality. In addition, the image capturing unit 100*h* can determine depth information of the imaged object. In this embodiment, the electronic device 300 includes multiple image capturing units 100, 100*d*, 100*e*, 100*f*, 100*g* and 100*h*, but the present disclosure is not limited to the number and arrangement of image capturing units.

When a user captures images of an object 306, the light rays converge in the image capturing unit 100, the image capturing unit 100*d* or the image capturing unit 100*e* to generate images, and the flash module 301 is activated for light supplement. The focus assist module 302 detects the object distance of the imaged object 306 to achieve fast auto focusing. The image signal processor 303 is configured to optimize the captured image to improve image quality. The light beam emitted from the focus assist module 302 can be either conventional infrared or laser. In addition, the light rays may converge in the image capturing unit 100*f*, 100*g* or 100*h* to generate images. The display module 304 can include a touch screen, and the user is able to interact with the display module 304 and the image software processor 305 having multiple functions to capture images and complete image processing. Alternatively, the user may capture images via a physical button. The image processed by the image software processor 305 can be displayed on the display module 304.

7th Embodiment

Figure 19:
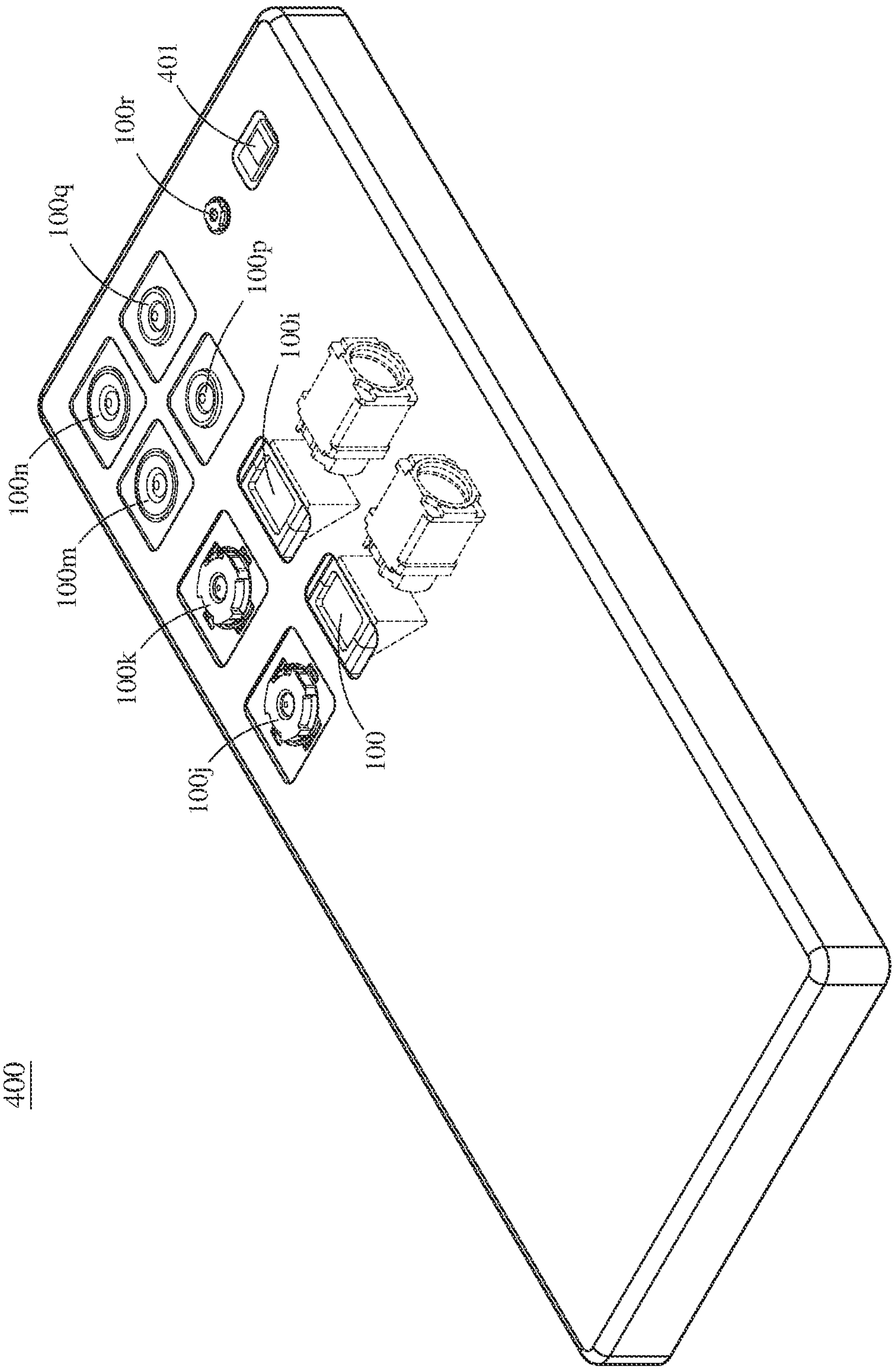
FIG. 19 is one perspective view of an electronic device according to the 7th embodiment of the present disclosure.

FIG. 19 is one perspective view of an electronic device according to the 7th embodiment of the present disclosure.

In this embodiment, an electronic device 400 is a smartphone including the image capturing unit 100 disclosed in the 4th embodiment, an image capturing unit 100*i*, an image capturing unit 100*j*, an image capturing unit 100*k*, an image capturing unit 100*m*, an image capturing unit 100*n*, an image capturing unit 100*p*, an image capturing unit 100*q*, an image capturing unit 100*r*, a flash module 401, a focus assist module, an image signal processor, a display module and an image software processor (not shown). The image capturing units 100, 100*i*, 100*j*, 100*k*, 100*m*, 100*n*, 100*p*, 100*q* and 100*r* are disposed on the same side of the electronic device 400, while the display module is disposed on the opposite side of the electronic device 400. Furthermore, each of the image capturing units 100*i*, 100*j*, 100*k*, 100*m*, 100*n*, 100*p*, 100*q* and 100*r* can include the image capturing module of the present disclosure and can have a configuration similar to that of the image capturing unit 100, and the details in this regard will not be provided again.

The image capturing unit 100 is a telephoto image capturing unit having a light-folding element configuration, the image capturing unit 100*i* is a telephoto image capturing unit having a light-folding element configuration, the image capturing unit 100*j* is a wide-angle image capturing unit, the image capturing unit 100*k* is a wide-angle image capturing unit, the image capturing unit 100*m* is an ultra-wide-angle image capturing unit, the image capturing unit 100*n* is an ultra-wide-angle image capturing unit, the image capturing unit 100*p* is a telephoto image capturing unit, the image capturing unit 100*q* is a telephoto image capturing unit, and the image capturing unit 100*r* is a ToF image capturing unit. In this embodiment, the image capturing units 100, 100*i*, 100*j*, 100*k*, 100*m*, 100*n*, 100*p* and 100*q* have different fields of view, such that the electronic device 400 can have various magnification ratios so as to meet the requirement of optical zoom functionality. Moreover, each of the image capturing units 100 and 100*i* can be a telephoto image capturing unit having a light-folding element configuration, so the total lengths of the image capturing units 100 and 100*i* are not restricted to the thickness of the electronic device 400. The light-folding element configuration of each of the image capturing unit 100 and 100*i* can be similar to, for example, one of the structures shown in FIG. 24 to FIG. 26, which can be referred to foregoing descriptions corresponding to FIG. 24 to FIG. 26, and the details in this regard will not be provided again. In addition, the image capturing unit 100*r* can determine depth information of the imaged object. In this embodiment, the electronic device 400 includes multiple image capturing units 100, 100*i*, 100*j*, 100*k*, 100*m*, 100*n*, 100*p* and 100*q*, but the present disclosure is not limited to the number and arrangement of image capturing units. When a user captures images of an object, the light rays converge in the image capturing unit 100, 100*i*, 100*j*, 100*k*, 100*m*, 100*n*, 100*p* or 100*q* to generate images, and the flash module 401 is activated for light supplement. Further, the subsequent processes are performed in a manner similar to the abovementioned embodiments, and the details in this regard will not be provided again.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the image capturing module of the present disclosure features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, aerial cameras, wearable devices, portable video recorders and other electronic imaging devices.

The foregoing description, for the purpose of explanation, has been described with reference to specific embodiments. It is to be noted that TABLES 1A-3C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing module comprising an aperture control unit, an imaging lens assembly and an image sensor, wherein the imaging lens assembly comprises, in order from an object side to an image side along an optical path, a first lens element and a second lens element, the first lens element is closest to the object side among all lens elements of the imaging lens assembly, and the image capturing module has a first state and a second state;

wherein, when the image capturing module is at the first state, the imaging lens assembly has a first f-number and a first viewing angle, the first f-number is Fno1, the first viewing angle is FOV1, and an image generated by the image capturing module is within a first sensing range;

wherein, when the image capturing module is at the second state, the imaging lens assembly has a second f-number and a second viewing angle, the second f-number is Fno2, the second viewing angle is FOV2, and an image generated by the image capturing module is within a second sensing range;

wherein, the first sensing range is encompassed within the second sensing range, the first sensing range is within an effective photosensitive area of the image sensor at the first state, and the second sensing range is within an effective photosensitive area of the image sensor at the second state;

wherein, the imaging lens assembly further comprises an aperture stop, the aperture stop is located at a lens barrel opening when the image capturing module is at the first state, the aperture stop is located at the aperture control unit when the image capturing module is at the second state, and a diameter of the lens barrel opening is from 4.0 mm to 6.5 mm;

wherein, a focal length of the imaging lens assembly is f, an entrance pupil diameter of the imaging lens assembly at the first state is EPD1, an entrance pupil diameter of the imaging lens assembly at the second state is EPD2, the first viewing angle is FOV1, the second viewing angle is FOV2, the first f-number is Fno1, half of a diagonal length of the first sensing range is ImgH1, half of a diagonal length of the second sensing range is ImgH2, an axial distance between the aperture stop and an image surface at the first state is SL1, an axial distance between the aperture stop and the image surface at the second state is SL2, an axial distance between the first lens element and the second lens element is T12, and the following conditions are satisfied:

$$1.5 < f/(EPD1 - EPD2) < 10.0;$$

$$10.0 \text{ degrees} < FOV2 - FOV1 < 50.0 \text{ degrees};$$

$$1.20 < Fno1 < 1.40;$$

$$1.20 \text{ mm} < ImgH2 - ImgH1 < 5.0 \text{ mm; and}$$

$$3.0 < (SL2 - SL1)/T12 < 18.0.$$

2. The image capturing module of claim 1, wherein the first f-number is Fno1, the second f-number is Fno2, and the following condition is satisfied:

$$0.30 < Fno2 - Fno1 < 1.20.$$

3. The image capturing module of claim 1, wherein a minimum value among Abbe numbers of all lens elements of the imaging lens assembly is Vmin, and the following condition is satisfied:

$$10.0 < Vmin < 20.0.$$

4. The image capturing module of claim 1, wherein half of the diagonal length of the second sensing range is ImgH2, and the following condition is satisfied:

$$5.0 \text{ mm} < ImgH2 < 10.0 \text{ mm}.$$

5. The image capturing module of claim 1, wherein the imaging lens assembly comprises seven or more lens elements, a curvature radius of an object-side surface of a lens element closest to the image surface among all lens elements of the imaging lens assembly is RL1, a curvature radius of an image-side surface of the lens element closest to the image surface among all lens elements of the imaging lens assembly is RL2, and the following condition is satisfied:

$$0.55 < (RL1 + RL2)/(RL1 - RL2) < 2.80.$$

6. The image capturing module of claim 3, wherein the imaging lens assembly comprises seven or more lens elements and comprises, in order from the object side to the image side along the optical path, the first lens element, the second lens element, a third lens element, a fourth lens element, a fifth lens element, a sixth lens element and a seventh lens element;

wherein, the focal length of the imaging lens assembly is f, a curvature radius of an image-side surface of the seventh lens element is R14, and the following condition is satisfied:

$$0 < f/R14 < 3.0.$$

7. The image capturing module of claim 3, wherein the imaging lens assembly comprises seven or more lens elements, an object-side surface of the second lens element is convex in a paraxial region thereof, an image-side surface of the second lens element is concave in a paraxial region thereof, there is a distance in a paraxial region between any two adjacent lens elements of the imaging lens assembly, and each of at least three lens elements of the imaging lens assembly has at least one inflection point.

8. The image capturing module of claim 1, wherein the imaging lens assembly comprises, in order from the object side to the image side along the optical path, the first lens element, the second lens element and a third lens element, and a maximum effective radius of the third lens element is minimum among maximum effective radii of all lens elements of the imaging lens assembly.

9. The image capturing module of claim 1, wherein an aperture diameter of the aperture control unit at the first state is D1, and the following condition is satisfied:

$$5.0 \text{ mm} < D1 < 7.0 \text{ mm}.$$

10. The image capturing module of claim 1, wherein an aperture diameter of the aperture control unit at the second state is D2, and the following condition is satisfied:

$$3.0 \text{ mm} < D2 < 5.0 \text{ mm}.$$

11. The image capturing module of claim 1, wherein a number of pixels within the first sensing range is more than ten million, and a number of pixels within the second sensing range is more than twenty million.

12. An electronic device, comprising:

the image capturing module of claim 1;

wherein the image capturing module further comprises a driving motor, and the driving motor comprises at least one ball.

* * * * *